(12) United States Patent
Zhu et al.

(10) Patent No.: US 11,537,642 B2
(45) Date of Patent: Dec. 27, 2022

(54) METHOD AND SYSTEM FOR PROVIDING A USER AGENT STRING DATABASE

(71) Applicant: YAHOO ASSETS LLC, Dulles, VA (US)

(72) Inventors: Ling Zhu, Beijing (CN); Min He, Beijing (CN); Fei Yu, Beijing (CN); Minzhang Wei, Beijing (CN)

(73) Assignee: YAHOO ASSETS LLC, Dulles, VA (US)

( * ) Notice: Subject to any disclaimer, the term of this patent is extended or adjusted under 35 U.S.C. 154(b) by 521 days.

(21) Appl. No.: 16/007,029

(22) Filed: Jun. 13, 2018

(65) Prior Publication Data

US 2018/0293297 A1    Oct. 11, 2018

Related U.S. Application Data

(63) Continuation of application No. 14/410,702, filed as application No. PCT/CN2014/092120 on Nov. 25, 2014, now Pat. No. 10,025,847.

(51) Int. Cl.
| | |
|---|---|
| *G06F 16/00* | (2019.01) |
| *G06F 16/31* | (2019.01) |
| *G06N 20/00* | (2019.01) |
| *G06F 16/35* | (2019.01) |
| *G06F 16/335* | (2019.01) |

(Continued)

(52) U.S. Cl.
CPC .......... *G06F 16/313* (2019.01); *G06F 16/335* (2019.01); *G06F 16/35* (2019.01); *G06F 16/358* (2019.01); *G06F 16/90344* (2019.01); *G06N 20/00* (2019.01); *H04L 67/02* (2013.01)

(58) Field of Classification Search
CPC ................................. G06F 16/90344
See application file for complete search history.

(56) References Cited

U.S. PATENT DOCUMENTS 6,516,337 B1    2/2003  Tripp
8,086,253 B1 *  12/2011 Kalamkar ............ H04L 51/066
                                                            455/466

(Continued)

FOREIGN PATENT DOCUMENTS

CN    101196904 A    6/2008
CN    101425131 A    5/2009

(Continued)

OTHER PUBLICATIONS

International Search Report dated Sep. 2, 2015 in International Application PCT/CN2014/092120.

(Continued)

*Primary Examiner* — Ajith Jacob
(74) *Attorney, Agent, or Firm* — Venable LLP

(57) ABSTRACT

Method, system, and programs for determining a keyword from user agent strings are disclosed. In one example, a plurality of user agent strings is received. The plurality of user agent strings is grouped into one or more clusters. The one or more clusters comprise a first cluster that includes two or more user agent strings. The two or more user agent strings in the first cluster are compared. Based on the comparing, a keyword is determined from the first cluster. The keyword represents a type of user agent information.

17 Claims, 19 Drawing Sheets

(51) Int. Cl.
*H04L 67/02* (2022.01)
*G06F 16/903* (2019.01)

(56) References Cited

U.S. PATENT DOCUMENTS

| | | | |
|---|---|---|---|
| 2007/0061243 A1* | 3/2007 | Ramer | G06Q 30/0275 |
| | | | 705/37 |
| 2011/0314077 A1 | 12/2011 | Serhat et al. | |
| 2012/0089582 A1 | 4/2012 | Kumar | |
| 2013/0204898 A1 | 8/2013 | Satoh | |
| 2013/0254190 A1 | 9/2013 | Nakano et al. | |
| 2014/0207773 A1 | 7/2014 | Hirate | |
| 2014/0337351 A1 | 11/2014 | Hirate | |

FOREIGN PATENT DOCUMENTS

| | | |
|---|---|---|
| CN | 101488861 A | 7/2009 |
| CN | 101964813 A | 2/2011 |
| CN | 102722585 A | 10/2012 |
| CN | 102763104 A | 10/2012 |
| CN | 103902596 A | 7/2014 |

OTHER PUBLICATIONS

International Preliminary Report on Patentability dated May 30, 2017 in International Application PCT/CN2014/092120.
International Search Report and Written Opinion dated Aug. 20, 2015 in International Application PCT/CN2014/092117.
International Preliminary Report on Patentability dated May 30, 2017 in International Application PCT/CN2014/092117.

* cited by examiner

METHOD AND SYSTEM FOR PROVIDING A USER AGENT STRING DATABASE

CROSS-REFERENCE TO RELATED APPLICATION

The present application is a continuation of U.S. patent application Ser. No. 14/410,702 filed Dec. 23, 2014, which is the United States national phase of International Application No. PCT/CN2014/092120 filed on Nov. 25, 2014, which are incorporated herein by reference in their entireties.

BACKGROUND

1. Technical Field

The present teaching relates to methods, systems, and programming for Internet services. Particularly, the present teaching is directed to methods, systems, and programming for user agent string analysis.

2. Discussion of Technical Background

A user agent is software that is acting on behalf of a user. When the user agent operates in a network protocol, it often identifies itself by submitting a characteristic identification string, called a user agent string, to an application server. It is important for the application server to accurately detect the user agent's identity, e.g. its application type, device information, operating system (OS), OS version, software vendor, software revision, browser, and browser version, based on the user agent string.

Existing techniques for detecting a user agent identity focus on comparing the user agent string with predefined regular expressions. The identity can be detected only when the user agent string matches an entire predefined regular expression, e.g. "Mozilla/[version] ([system and browser information]) [platform] ([platform details]) [extensions]" according to a main stream user agent schema. However, there are a huge number of user agent strings that do not conform to the main stream user agent schema. The user agent schema is always changing and can hardly be covered by predefined regular expressions, which yields a low detection rate of user agent identity. In addition, there will be new devices, new OS or OS versions, new browsers every month or even every week. In that situation, existing techniques need efforts to collect new information from market/manufacturers to generate new regular expressions and make sure they don't conflict with existing regular expressions, which requires lots of manual work from a big human team.

Therefore, there is a need to provide an improved solution for detecting a user agent identity to solve the above-mentioned problems.

SUMMARY

The present teaching relates to methods, systems, and programming for Internet services. Particularly, the present teaching is directed to methods, systems, and programming for user agent string analysis.

In one example, a method, implemented on at least one computing device each of which has at least one processor, storage, and a communication platform connected to a network for determining a keyword from user agent strings, is disclosed. A plurality of user agent strings is received. The plurality of user agent strings is grouped into one or more clusters. The one or more clusters comprise a first cluster that includes two or more user agent strings. The two or more user agent strings in the first cluster are compared. Based on the comparing, a keyword is determined from the first cluster. The keyword represents a type of user agent information.

In another example, a system having at least one processor storage, and a communication platform for determining a keyword from user agent strings, is disclosed. The system comprises a user agent receiver, a user agent clustering unit, a user agent comparing unit, and a keyword determiner. The user agent receiver is configured for receiving a plurality of user agent strings. The user agent clustering unit is configured for grouping the plurality of user agent strings into one or more clusters. The one or more clusters comprise a first cluster that includes two or more user agent strings. The user agent comparing unit is configured for comparing the two or more user agent strings in the first cluster. The keyword determiner is configured for determining a keyword from the first cluster based on the comparing. The keyword represents a type of user agent information.

Other concepts relate to software for implementing the keyword determination from user agent strings. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a non-transitory machine-readable medium having information recorded thereon for determining a keyword from user agent strings is disclosed. The information, when read by the machine, causes the machine to perform the following. A plurality of user agent strings is received. The plurality of user agent strings is grouped into one or more clusters. The one or more clusters comprise a first cluster that includes two or more user agent strings. The two or more user agent strings in the first cluster are compared. Based on the comparing, a keyword is determined from the first cluster. The keyword represents a type of user agent information.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
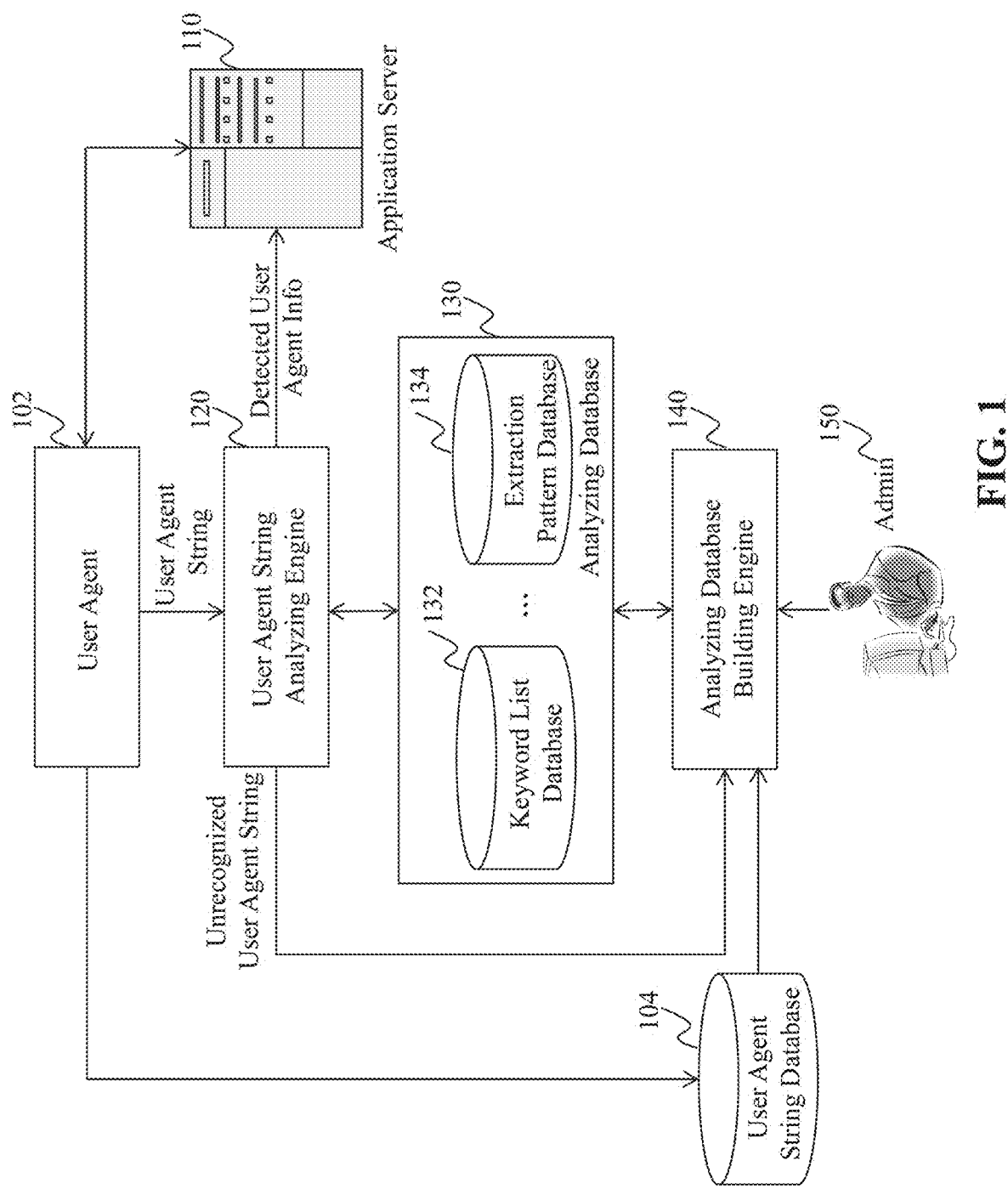
FIG. 1 illustrates an exemplary system for analyzing user agent strings, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and accurate user agent identity detection. The method and system as disclosed herein aim at improving detection rate and coverage of user agent identity information, including but not limited to application type, device information, OS, OS version, software vendor, software revision, browser, browser version, etc. A user agent string analyzing engine may receive a user agent string from a user, via an application server. Based on a list of predefined keywords, the analyzing engine may extract candidate keywords from the user agent string, and validate some of them as keywords based on e.g. their neighbor charsets. For example, based on left charset and right charset of a candidate keyword, the analyzing engine may determine whether the candidate keyword is a true keyword or not. The keywords can include OS keywords, browser keywords, etc.

For OS keywords, the analyzing engine can sort them based on their predetermined weights. For example, when there are two or more OS keywords shown in the user agent string, their weights can be used to determine which OS keyword represents the true OS. The analyzing engine may also retrieve extraction patterns for each OS keyword from a database. An extract pattern may be used to extract OS version based on conditions the user agent string matches with. For example, an extract pattern may indicate that if a user agent string includes a sub-string "ber" followed by "(\d+\.\d+)", extract the "\d+\.\d+" part as the OS version. If version extraction for one condition fails, the analyzing engine may try the next condition or the next keyword in the user agent string with a lower weight. For other keywords like browser keywords, device keywords, etc., the analyzing engine may detect them and extract corresponding versions in a similar manner as the OS keyword.

When there are new devices, new OS/browser or new OS/browser versions, there may be detection failures from a large set of user agent strings. In that case, an analyzing database building engine may collect the detection failures and extract new keywords from the failed user agent strings. For example, the building engine may group the failed user agent strings into clusters and rank the clusters by number of their respective user agent strings. The building engine may compare user agent strings in the top clusters and automatically determine new keywords based on the comparisons. The newly determined keywords may be stored in a database for future user agent detection.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system for analyzing user agent strings, according to an embodiment of the present teaching. The exemplary system includes an application server 110, a user agent 102, a user agent string database 104, a user agent string analyzing engine 120, an analyzing database 130, an analyzing database building engine 140, and an optional administrator 150. The user agent 102 may be software installed on a user device to communicate with the user agent string analyzing engine 120 and/or the application server 110. The user agent 102 may submit a user agent string that includes its identity related information like its application type, device information, operating system (OS), OS version, software vendor, software revision, browser, browser version, etc. The user agent string database 104 stores all previously submitted user agent strings from the user agent 102 and/or other user agents (not shown).

Figure 2:
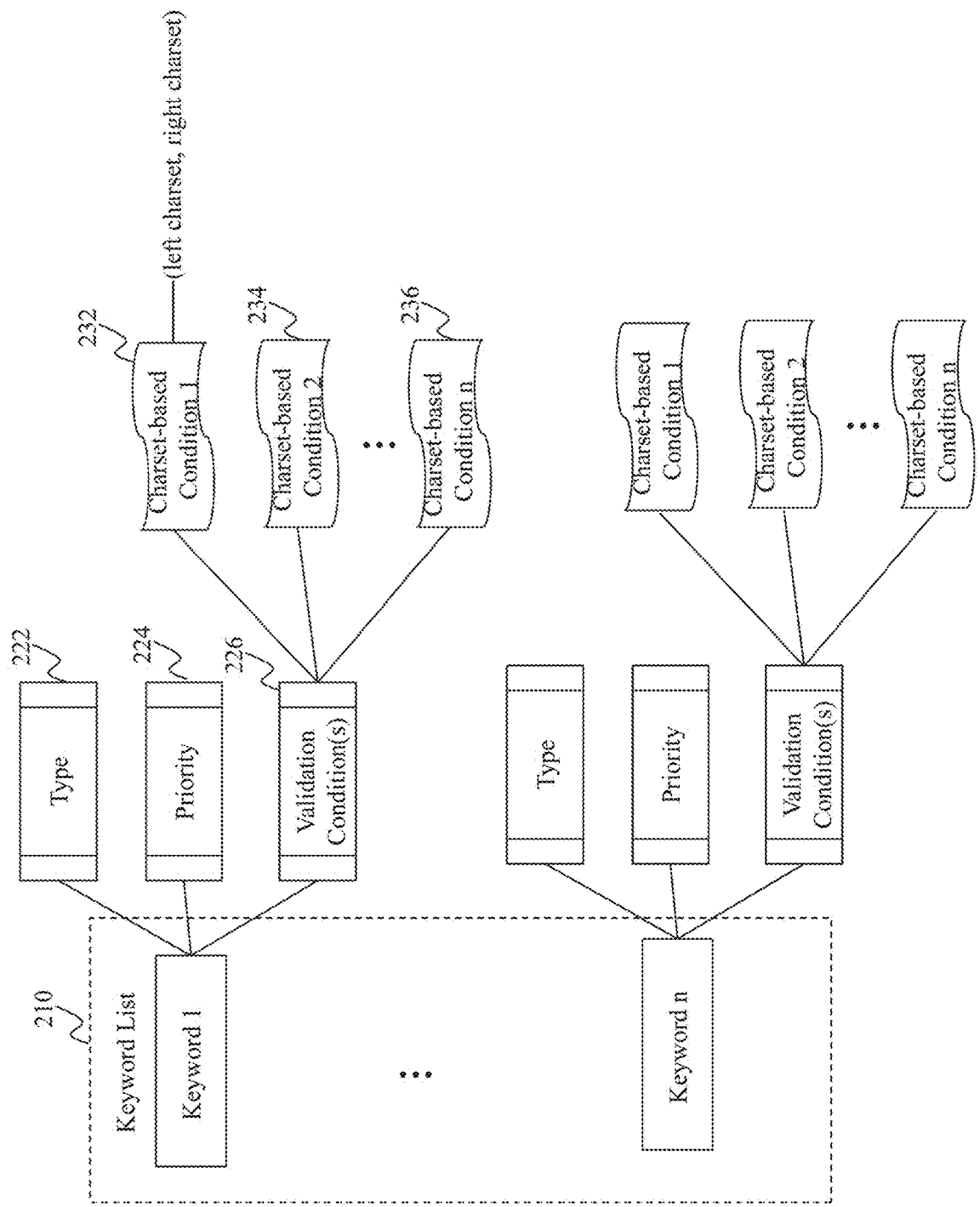
FIG. 2 illustrates keyword list stored in a database, where each keyword is associated with type, priority and validation conditions, according to an embodiment of the present teaching.

Based on user agent strings in the user agent string database 104, the analyzing database building engine 140 may build up the analyzing database 130 for analyzing a user agent string. The analyzing database 130 may comprise a keyword list database 132, an extraction pattern database 134, and other databases. FIG. 2 illustrates a keyword list 210 stored in the keyword list database 132, according to an embodiment of the present teaching. As shown in FIG. 2, each keyword in the keyword list 210 is associated with a type 222, a priority 224, and validation conditions 226. The type 222 may represent a type of the keyword, which may be OS, browser, device, etc. For example, "blackberry" is a keyword with a device type; and "windows" is a keyword with an OS type. The following is an exemplary keyword list: ( . . . |blackberry|macintosh|symbiano|mac os x|nintendo|android|windows|symbian| . . . ), where different keywords may have different types.

The priority 224 in FIG. 2 may represent a weight of the keyword when it appears together with other keywords in a user agent string. For example, the following defines keyword weights or priorities for different OS type keywords:

```
array(
    "android" => 100,
    "winnt" => 60,
    ...
    "linux" => 0
);
``` which means if "android", "winnt", and "linux" are all shown in a same user agent string, "android" has the highest probability to represent a true OS and hence has the highest priority to be analyzed for version and other related information, while "winnt" has a lower probability and priority, and "linux" has the lowest probability and priority. The weights shown above may be determined by the administrator 150 based on prior experience and/or dynamically modified by the analyzing database building engine 140 based on user agent detection rate at the user agent string analyzing engine 120. In present disclosure, "user agent detection rate", "user agent coverage rate", and "user agent detection coverage" will be used interchangeably to mean a rate or probability of correct detection of a user agent's identity information.

The validation conditions 226 in FIG. 2 may represent conditions for validating the keyword when this keyword is shown in a user agent string. For example, "linux" shown in a user agent string may or may not represent an OS. This can be determined or validated by a prefix charset, e.g. "Red Hat". That is, if a prefix charset "Red Hat" is found in the same user agent string, the "linux" can be validated as an OS type keyword found in the user agent string. In general, the validation conditions 226 may comprise different charset-based conditions 232, 234 . . . 236. For example, charset-based condition 1 232 may specify left (prefix) charset and right (subfix) charset for a keyword to validate or invalidate the keyword, in the following format: "keyword"⇒array ("prefix charset", "subfix charset", "valid or invalid"). For example, "mobile"⇒array("(", ";", "valid") means that the keyword "mobile" is valid when it has a prefix "(" and a subfix ";", i.e., when it is shown in form of "(mobile;". In other examples, some charsets may be specified to make a keyword invalid, in accordance with the above format. In some embodiments, the validation conditions 226 may include conditions not based on charset, but based on e.g. position of the keyword, frequency of the keyword, source of the keyword, etc.

Figure 3:
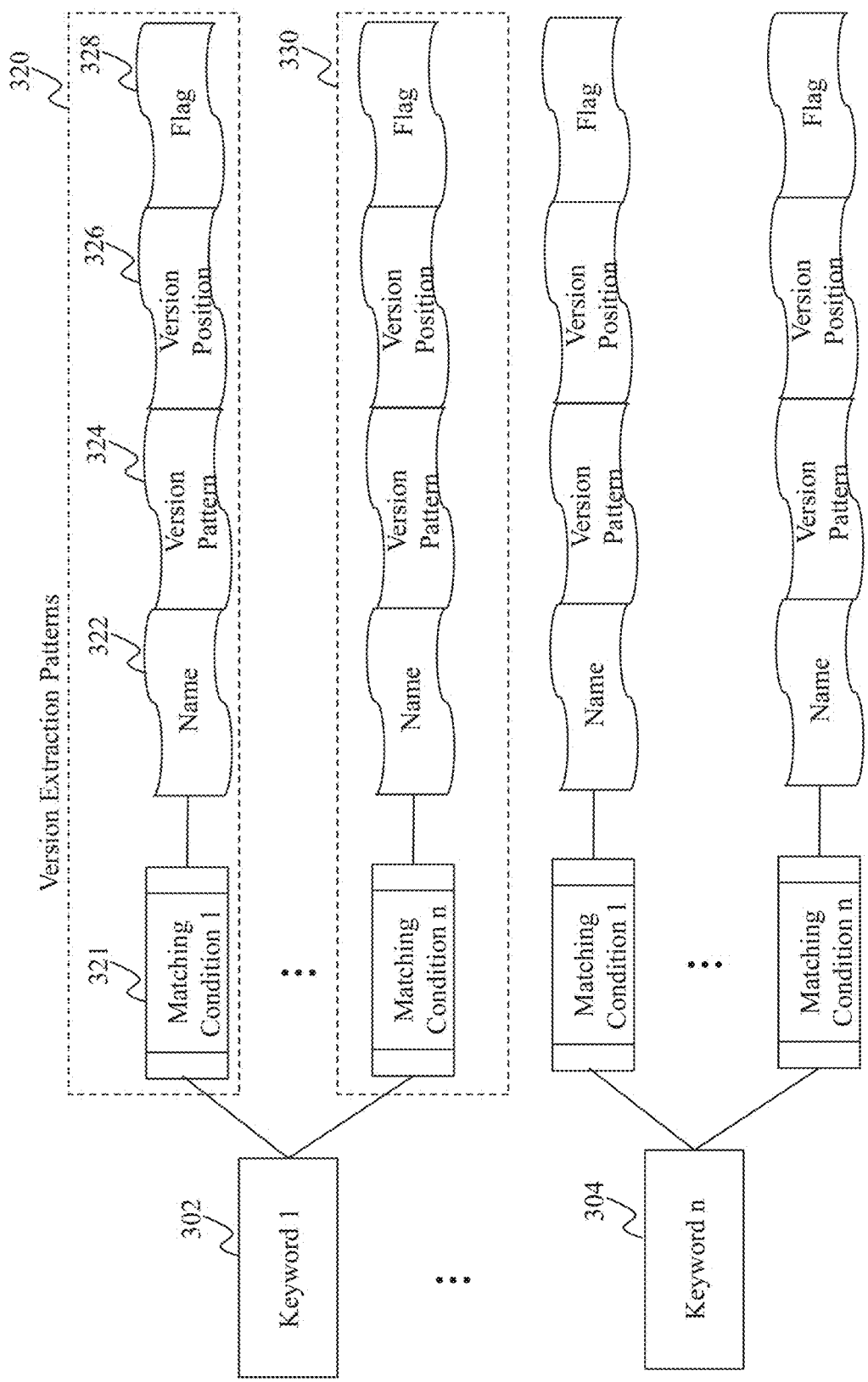
FIG. 3 illustrates version extraction patterns stored in a database, where each keyword may be associated with different version extraction patterns, according to an embodiment of the present teaching.

FIG. 3 illustrates version extraction patterns stored in the extraction pattern database 134, according to an embodiment of the present teaching. As shown in FIG. 3, each keyword may be associated with different version extraction patterns. For example, keyword 1 302 is associated with version extraction patterns 320 . . . 330. A version extraction pattern, e.g. the version extraction pattern 320, may include a matching condition 321, a name 322, a version pattern 324, a version position 326, and a flag 328. The matching condition 321 is a condition to be tested with a user agent string having keyword 1. Assuming keyword 1 has a type of OS, if the user agent string meets the matching condition 321, the user agent string analyzing engine 120 will determine the name 322 as the name of OS and may extract OS version according to the version pattern 324 and the version position 326. The version pattern 324 indicates a pattern of characters expected in the user agent string. The version position 326 indicates a position in the version pattern 324 where version information is located. The flag 328 indicates the next step in case the version extraction fails. The version extract patterns have the following format:

```
"keyword1" = array(
    array("condition1", "name1", "version pattern1",
        "version pos1", "flag1"),
    array("condition2", "name2", "version pattern2",
        "version pos2", "flag2")
    ...
)
```

An exemplary version extract pattern for keyword "blackberry" is shown below:

```
"blackberry" => array(
    array(" ber", "blackberry", " ber(\d+\.\d+)", 1, ""),
    array("version", "blackberry", "blackberry(?!; opera).
        *?version\/(\d+\.\d+)", 1, ""),
    array("midp", "blackberry", "blackberry(?! opera).
        *?\/(\d+\.\d)", 1, ""),
    array("ucweb", "blackberry", "blackberry.
        *?(\/|; )(\d+\.\d)", 2, ""),
    array("opera", "blackberry", "", -1, ""),
    array ("-1", "blackberry", "", -1, "")
)
```

In this example, the first array indicates that if a user agent string having OS keyword "blackberry" includes a substring "ber", the OS name will be identified as "blackberry" and the OS version will be extracted from the version pattern "ber(\d+\.\d+)". The version pattern "ber(\d+\.\d+)" means a string has "ber" followed by "'one or more digits'. 'one or more digits'". The version position is 1, which indicates that the OS version is located inside the first pair of parentheses in the version pattern "ber(\d+\.\d+)", i.e. the part of "\d+\.\d+". For example, if a string="bla bla ber10.2 bla", the system will determine OS name as "blackberry", extract version using the version pattern "ber(\d+\.\d+)", and return the version as "10.2". The pair of parentheses may indicate boundary for some digits.

In the above example, the version pattern in the second array is "blackberry(?!; opera).*?version\/(\d+\.\d+)". This means that a subject string is expected to include "blackberry", not followed by "; opera", then followed by any characters until meet "version/'one or more digits'. 'one or more digits'". The version pattern in the fourth array is "blackberry.*?(\/|;)(\d+\.\d+)", which means that the subject string is expected to include "blackberry" followed by any characters, then a character "/" or ";", then "'one or more digits'. 'one or more digits'". The version position in the fourth array is 2, which means the OS version is located inside the second pair of parentheses of the version pattern. When the version position is -1, e.g. in the fifth array and the sixth array, no version is extracted. When the matching condition is −1, e.g. in the sixth array, a default value is assigned, e.g. the default value here is "blackberry" without version information.

In some scenario, the version extraction may fail even if the matching condition is met. For example, a user agent string includes "ber" but does not include "(\d+\.\d+)" as expected in the version pattern of the first array above. In this case, the system will check the flag 328 to determine the next step. The flag 328 may be "c" which means trying next condition, e.g. trying the second condition if the first condition fails to give the version. The flag 328 may be "k" which means trying next extracted keyword, e.g. trying another keyword "linux" if the keyword "blackberry" fails to give the version, when the user agent string includes both keywords "linux" and "blackberry". In practice, when a user agent string includes multiple keywords, the order of the keywords to be tested for version extraction may be determined based on their respective priorities 224. If the flag 328 is neither "c" nor "k", no version value or a default version value will be applied.

Referring back to FIG. 1, the analyzing database building engine 140 may build up the keyword list database 132 and the extraction pattern database 134, based on historical user agent strings and/or unrecognized user agent strings from the user agent string analyzing engine 120. The user agent string analyzing engine 120 in this example receives and analyzes user agent strings from the user agent 102 and sends the detected user agent information to the application server 110. The detected user agent information may include identity information of the user agent, like application type, device information, OS, OS version, software vendor, software revision, browser, and browser version. As such, the application server 110 can utilize the information for web page content adaptation, advertisement targeting, personalization analysis, etc.

Figure 4:
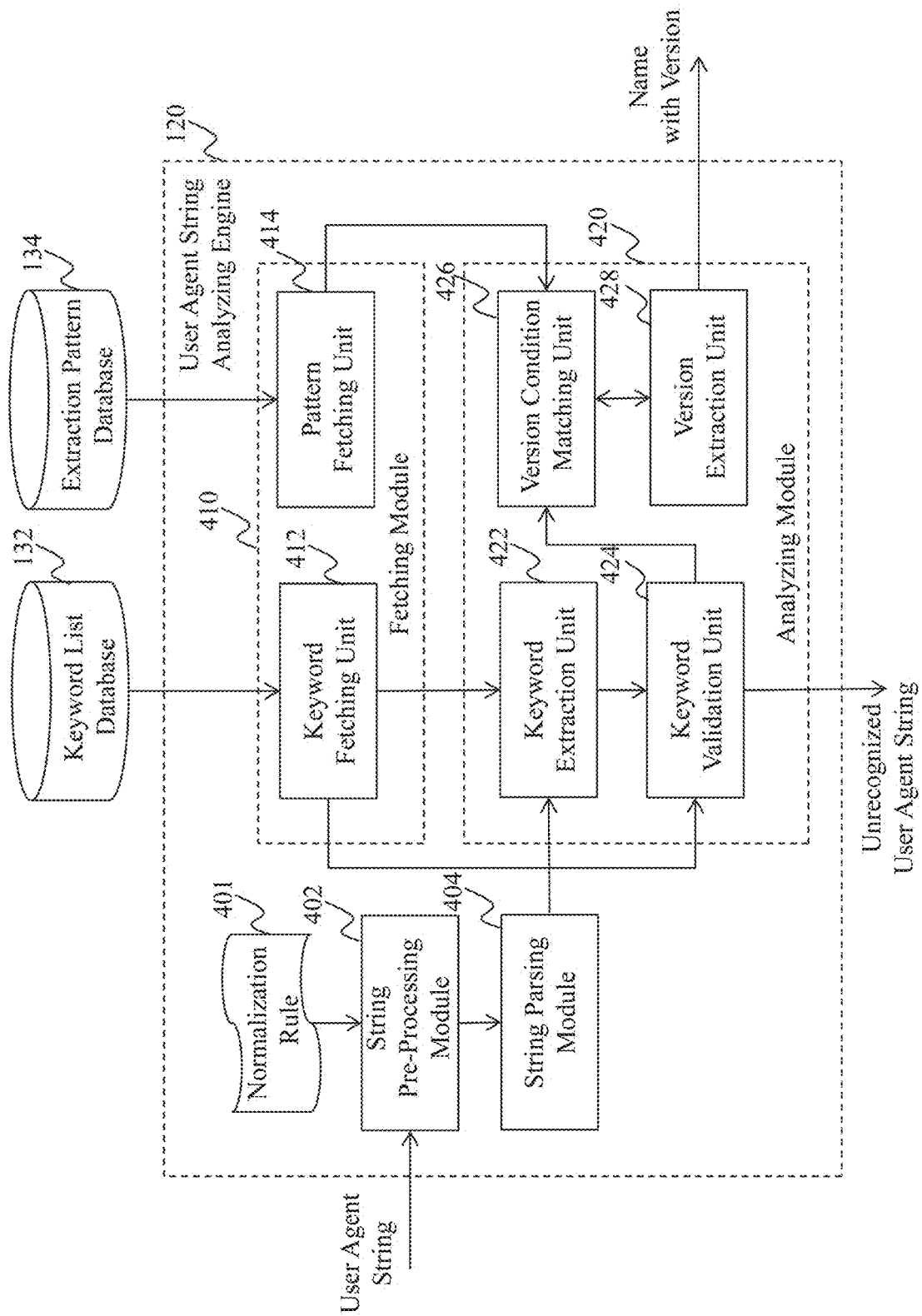
FIG. 4 illustrates an exemplary diagram of a user agent string analyzing engine, according to an embodiment of the present teaching.

FIG. 4 illustrates an exemplary diagram of the user agent string analyzing engine 120, according to an embodiment of the present teaching. The user agent string analyzing engine 120 in this example includes normalization rule 401, a string pre-processing module 402, a string parsing module 404, a fetching module 410, and an analyzing module 420. The string pre-processing module 402 in this example may receive a user agent string, e.g. from the user agent 102. The string pre-processing module 402 may normalize the received user agent string based on the normalization rule 401. For example, the normalization may include lowercasing the string, pre-appending and post-appending spaces to the string, etc. The string parsing module 404 in this example may parse the user agent string and send the parsed string to the analyzing module 420 for keyword extraction.

The fetching module 410 in this example includes a keyword fetching unit 412 and a pattern fetching unit 414. The keyword fetching unit 412 may fetch or retrieve a keyword list with associated metadata from the keyword list database 132. The associated metadata may include information about type, priority, and validation conditions associated with the retrieved keywords. The keyword fetching unit 412 may send the retrieved keyword list with the associated metadata to the analyzing module 420 for keyword extraction.

The pattern fetching unit 414 may fetch or retrieve version extraction patterns from the extraction pattern database 134. As discussed above, each version extraction pattern may include a matching condition, a name, a version pattern, a version position, and a flag. The pattern fetching unit 414 may send the retrieved version extraction patterns to the analyzing module 420 for version extraction.

The analyzing module 420 in this example includes a keyword extraction unit 422, a keyword validation unit 424, a version condition matching unit 426, and a version extraction unit 428. The keyword extraction unit 422 may receive the parsed user agent string from the string parsing module 404 and receive the fetched keyword list from the keyword fetching unit 412. The keyword extraction unit 422 may compare the parsed user agent string with the fetched keyword list to identify one or more candidate keywords. Each candidate keyword is included in the parsed user agent string and matches a keyword in the keyword list. The keyword extraction unit 422 then sends each candidate keyword to the keyword validation unit 424 for validation.

The keyword validation unit 424 may receive the retrieved keywords and their respective associated metadata from the keyword fetching unit 412. For each candidate keyword sent by the keyword extraction unit 422, the keyword validation unit 424 may check its validity based on some validation conditions contained in the associated metadata. For example, the keyword validation unit 424 may utilize neighbor charsets to validate or invalidate a candidate keyword. A neighbor charset may be a prefix charset that is before the candidate keyword in the user agent string, or a subfix charset that is after the candidate keyword in the user agent string. In one example, a validation condition "mobile"⇒array("(", ";", "valid") means that the candidate keyword "mobile" is validated when it has a prefix "(" and a subfix ";", i.e., when it is shown in form of "(mobile;". In another example, a validation condition "mobile"⇒array ("t", ";", "invalid") means that the candidate keyword "mobile" is invalidated when it has a prefix "t" and a subfix ";", i.e., when it is shown in form of "tmobile;".

After validation and/or invalidation of the candidate keywords, the keyword validation unit 424 may determine one or more valid keywords in the user agent string. The keyword validation unit 424 may assign each valid keyword into a category based on the type of the keyword. The type information is in the associated metadata sent by the keyword fetching unit 412. For example, the keyword validation unit 424 may assign the keywords into OS category, browser category, device category, etc. When there are multiple keywords in a category, the keyword validation unit 424 may rank the keywords in the category based on their respective priorities. The priority information is in the associated metadata sent by the keyword fetching unit 412. For example, when two keywords "android" and "winnt" in the OS category are both identified and validated from a same user agent string, the keyword validation unit 424 may rank "android" higher than "winnt" if "android" has a higher priority than "winnt" in the keyword list database 132. Their priorities may be determined by the administrator 150 based on his/her expertise, or based on a machine learning model fed with a large volume of training data of user agent strings. Here, a higher priority indicates a higher probability to truly represent the OS of the user agent. The keyword validation unit 424 may then send the ranked keywords in each category to the version condition matching unit 426 for version extraction.

In one situation, when there is no valid keyword identified from the user agent string, the keyword validation unit 424 will send the unrecognized user agent string to the analyzing database building engine 140 for failure analysis. A user agent string is unrecognized when there is no candidate keyword extracted based on the keyword list in the keyword list database 132, or when all candidate keywords extracted are invalidated at the keyword validation unit 424.

The version condition matching unit 426 in this example receives the retrieved version extraction patterns from the pattern fetching unit 414. For each category of keywords sent by the keyword validation unit 424, the version condition matching unit 426 may process the keywords one by one in the category according to their rankings determined by the keyword validation unit 424. The version condition matching unit 426 can first process the keyword with a highest ranking, then one by one down the ranking. For each keyword, the version condition matching unit 426 may obtain one or more version matching conditions from the pattern fetching unit 414.

Referring to the above example for keyword "blackberry" in OS category, a list of version matching conditions can be obtained. The version condition matching unit 426 can check the conditions one by one according to their orders in the list. For each condition, the version condition matching unit 426 may check whether it is met by the user agent string. When the condition is a character string, the version condition matching unit 426 may check whether the character string is included in the user agent string. When the character string is "−1 ", the condition may be defined to be met by any user agent string. If one condition is not met, the version condition matching unit 426 goes on to check the next condition in the list.

When a condition is met, the version condition matching unit 426 will inform the version extraction unit 428 for version extraction. The version extraction unit 428 in this example receives a version extraction pattern with a met condition identified by the version condition matching unit 426. Based on the version extraction pattern, the version extraction unit 428 may extract a version from the user agent string. Referring to the above example for keyword "blackberry", a exemplary version extraction pattern may be array("ber", "blackberry", "ber(\d+\.\d+)", 1, "c"). The version condition matching unit 426 can determine a user agent string "blackberry xxx ber10.2 zzz" includes the matching condition charset "ber", and inform the version extraction unit 428 for version extraction. The version extraction unit 428 can determine the OS name to be "blackberry" based on the above exemplary pattern. The version extraction unit 428 can also extract version number 10.2 from the user agent string, because they are the digits following "ber" in the version pattern "ber(\d+\.\d+)". The version extraction unit 428 may then send the OS name and version "blackberry 10.2" to the application server 110.

If the version extraction unit 428 cannot extract version information from a user agent string, the version extraction unit 428 may check the flag in the version extraction pattern. This may happen when a user agent string, e.g. "blackberry xxx berry zzz", includes the condition charset "ber" but does not conform to the version pattern "ber(\d+\.\d+)". In the above exemplary version extraction pattern, the flag is "c", which means the version extraction unit 428 will inform the version condition matching unit 426 to check the next condition in the list. If the version condition matching unit 426 determines that this is the last condition, the version extraction unit 428 may assign a default value to the version. In another example, if the flag is "k", the version extraction unit 428 will inform the version condition matching unit 426 to check the conditions for next keyword in the same category. If the version condition matching unit 426 determines that this is the last keyword in the category, the version extraction unit 428 may assign a default value to the version. In yet another example, if the flag is other than "c" and "k", the version extraction unit 428 may use a default value as the version information. The default values mentioned above may be determined by the administrator 150 based on his/her expertise and/or experience, or based on a machine learning model fed with a large volume of training data of user agent strings. For example, version 10 may be determined to be a default version for keyword "blackberry" in the OS category.

A keyword may be assigned to multiple categories. For example, keyword "blackberry" may be assigned to both the device category and the OS category. In this case, the keyword can be processed separately according to different category. For example, "blackberry" may be ranked higher in the device category but ranked lower in the OS category. For example, "blackberry" may have a condition met for version extraction in the device category but have no condition met for version extraction in the OS category.

Figure 5:
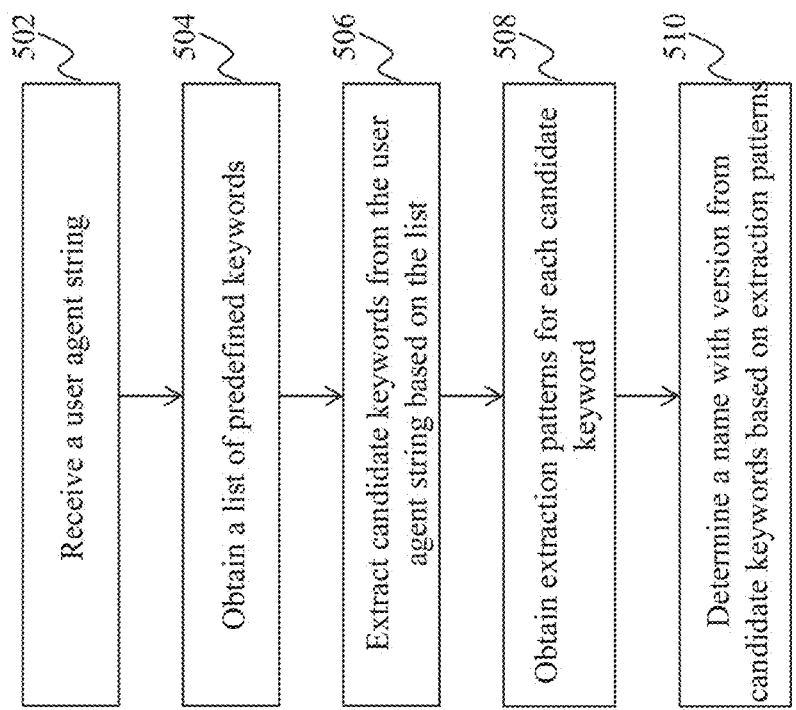
FIG. 5 is a flowchart of an exemplary process performed by a user agent string analyzing engine, according to an embodiment of the present teaching.

FIG. 5 is a flowchart of an exemplary process performed by the user agent string analyzing engine 120, according to an embodiment of the present teaching. At 502, a user agent string is received. At 504, a list of predefined keywords is obtained. At 506, candidate keywords are extracted from the user agent string based on the list. At 508, version extraction patterns are obtained for each candidate keyword. At 510, a keyword name with version is determined from candidate keywords based on the version extraction patterns.

Figure 6:
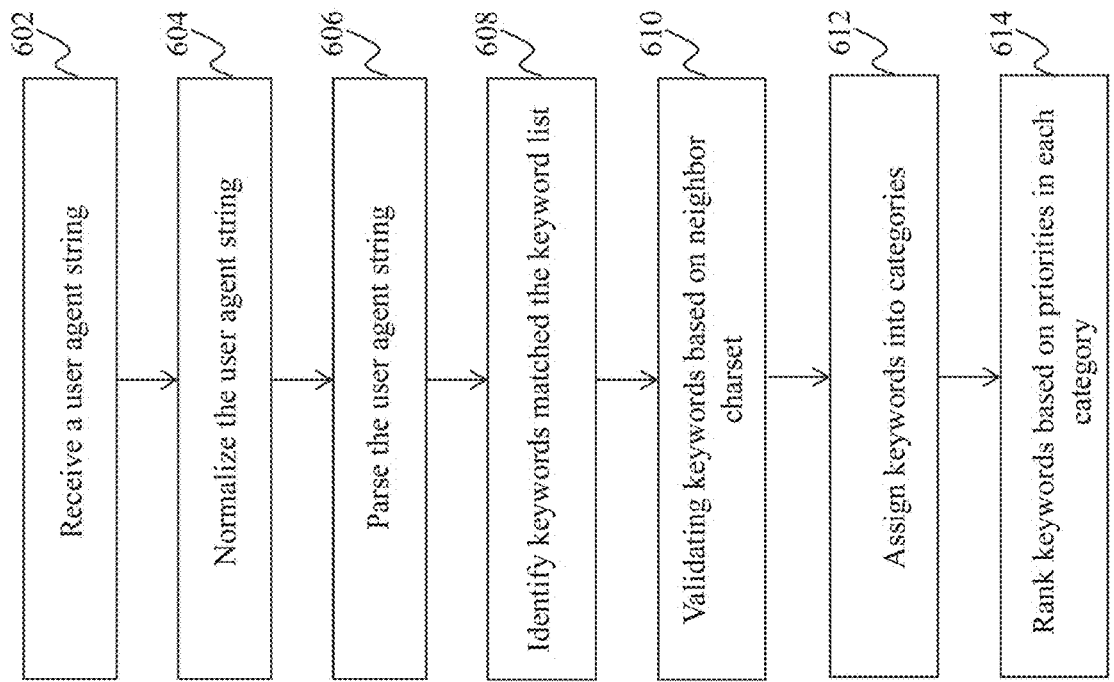
FIG. 6 is a flowchart of another exemplary process performed by a user agent string analyzing engine regarding extracting keywords, according to an embodiment of the present teaching.

FIG. 6 is a flowchart of another exemplary process performed by the user agent string analyzing engine 120 regarding extracting keywords, according to an embodiment of the present teaching. At 602, a user agent string is received. At 604, the user agent string is normalized. At 606, the user agent string is parsed, e.g. into multiple sub-strings. At 608, keywords are identified from the parsed user agent string based on a match between the parsed user agent string and a retrieved keyword list. At 610, keywords are validated based on neighbor charsets. At 612, keywords are assigned into categories, based on their associated types. At 614, keywords are ranked based on priorities in each category.

Figure 7:
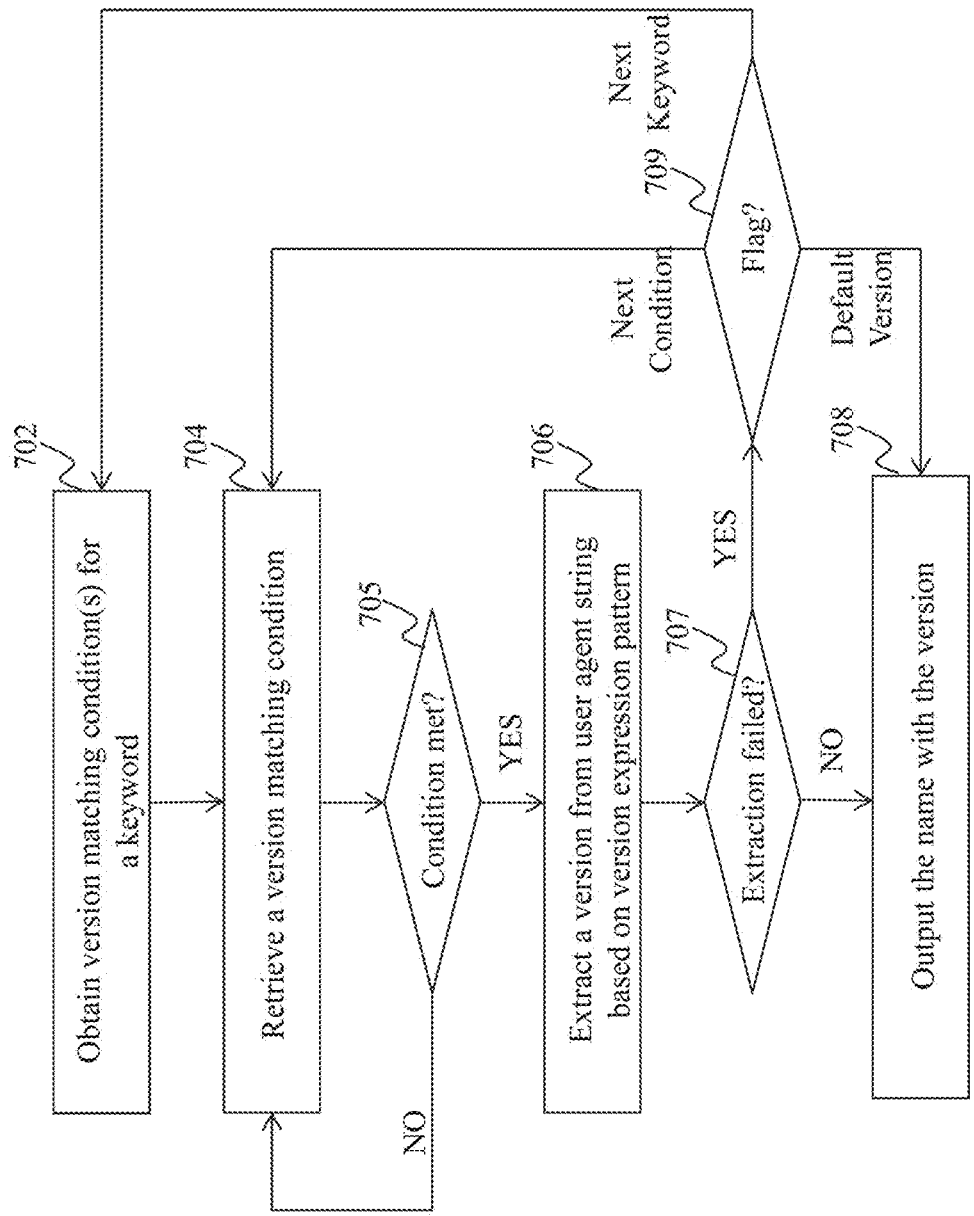
FIG. 7 is a flowchart of yet another exemplary process performed by a user agent string analyzing engine regarding extracting a version for each keyword, according to an embodiment of the present teaching.

FIG. 7 is a flowchart of yet another exemplary process performed by the user agent string analyzing engine 120 regarding extracting a version for each keyword, according to an embodiment of the present teaching. At 702, version matching condition(s) are obtained for a keyword. At 704, a version matching condition is retrieved. At 705, it is determined whether the condition is met. If the condition is not met, the process goes back to 704 to retrieve another version matching condition. If the condition is met, the process goes to 706, where a version is extracted from the user agent string based on the version expression pattern.

Moving to 707, it is determined whether the version extraction failed. If so, the process goes to 709 to check the flag in the version expression pattern. Based on the value of the flag, the process may go to 704 to retrieve next condition, or go to 702 to process next keyword, or go to 708 with a default version. If the version extraction did not fail, the process goes directly to 708. At 708, the keyword name and the version (extracted or default version) are output, e.g. to an application server.

Figure 8:
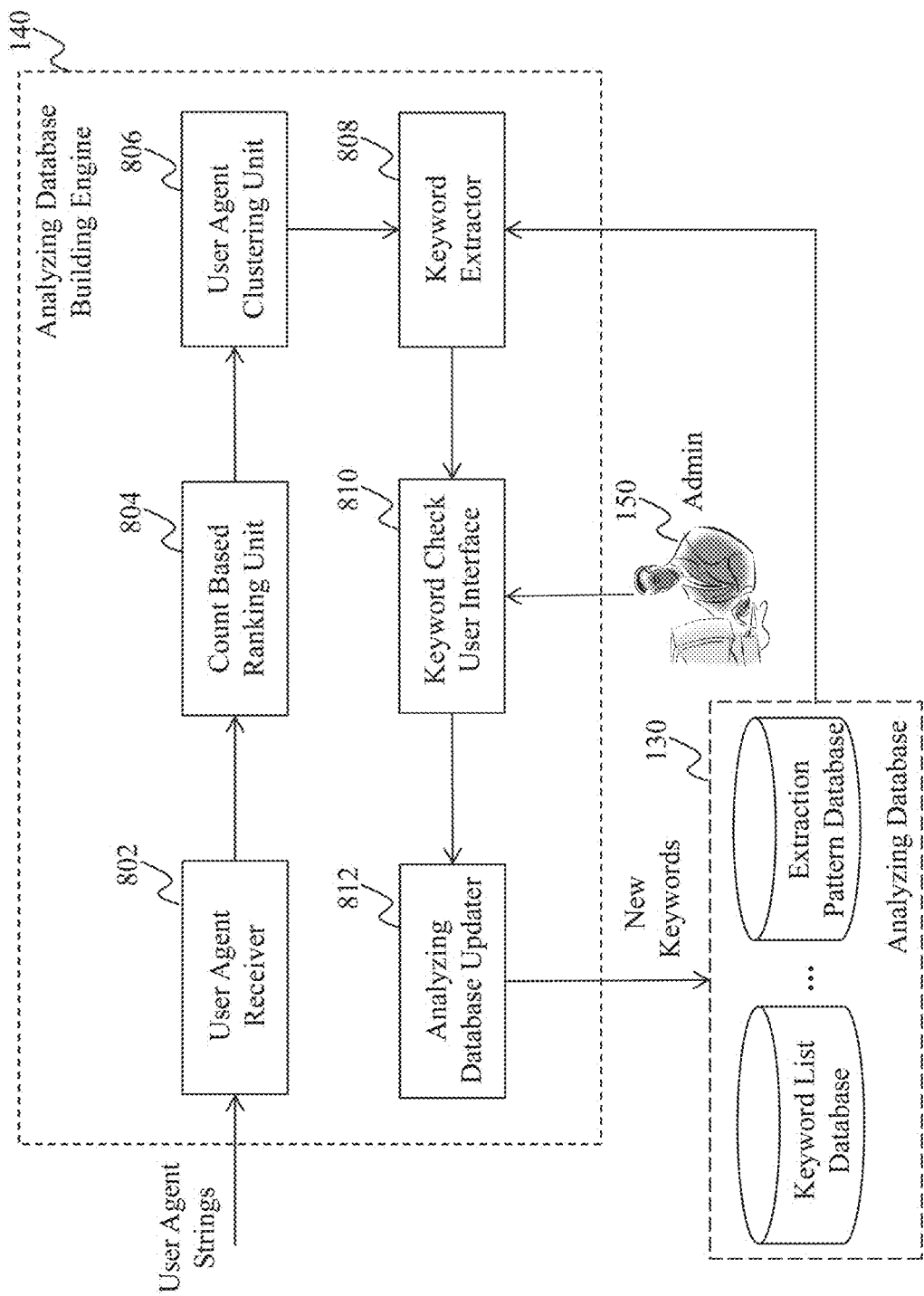
FIG. 8 illustrates an exemplary diagram of an analyzing database building engine, according to an embodiment of the present teaching.

FIG. 8 illustrates an exemplary diagram of the analyzing database building engine 140, according to an embodiment of the present teaching. The analyzing database building engine 140 in this example includes a user agent receiver 802, a count based ranking unit 804, a user agent clustering unit 806, a keyword extractor 808, a keyword check user interface 810, and an analyzing database updater 812.

The user agent receiver 802 in this example receives user agent strings, either from the user agent string database 104 or from the unrecognized user agent strings sent by the user agent string analyzing engine 120. These user agent strings represents detection failures of some user agents. This may be because the user agent strings include information about a new device, a new OS, or a new browser whose keywords have not been stored in the analyzing database 130. In one example, the analyzing database building engine 140 may daily collect user agent strings from an Audience Business Feed, which contains records of all the traffic coming to Yahoo. Then, the analyzing database building engine 140 may find out the user agent strings unrecognized by the user agent string analyzing engine 120.

The count based ranking unit 804 in this example may rank the unrecognized user agent strings based on their respective counts. For example, a list of user agents with counts are listed below, in the format of user-agent|count:

iBank/40093 CFNetwork/520.5.1 Darwin/11.4.2 (x86_64) (iMac11%2C3)|1000
UCWEB/2.0(Linux; U; en-us; GT-57262 Build/JZO54K) U2/1.0.0 UCBrowser/9.4.1.362 Mobile|900
Soulver/4918 CFNetwork/673.0.3 Darwin/13.0.0 (x86_64) (MacBookPro10%2C1)|800
UCWEB/2.0(Linux; U; en-us; AKL_M501 Build/IMM76D) U2/1.0.0 UCBrowser/9.4.1.362 Mobile|700

The first user agent string "iBank/40093 CFNetwork/520.5.1 Darwin/11.4.2 (x86_64) (iMac11%2C3)" has appeared 1000 times in the traffic, and is ranked the first according to its highest counts.

The user agent clustering unit 806 in this example groups the user agent strings into clusters. The grouping may be based on a distance measure between user agent strings. The distance measure may be Levenshtein distance. Some clusters having a smaller distance to each other may be merged into one big cluster. By merging the user agent strings into clusters, the analyzing database building engine 140 may focus on analyzing clusters with most popular user agent strings.

The keyword extractor 808 in this example may compare different user agent strings in each cluster or only in top clusters with most popular user agent strings. Based on the comparing, the keyword extractor 808 may extract some new keywords that can represent a new device, a new OS, a new browser, etc. The keyword extractor 808 may send the extract new keywords to the keyword check user interface 810, where the administrator 150 can check these new keywords. The keyword check user interface 810 and the administrator 150 are both optional in the system.

The analyzing database updater 812 in this example may determine associated metadata for each new keyword. The associated metadata may include information about the keyword's type, priority, and validation condition(s). The analyzing database updater 812 may then update the analyzing database 130 with the new keywords and their associated metadata.

Figure 9:
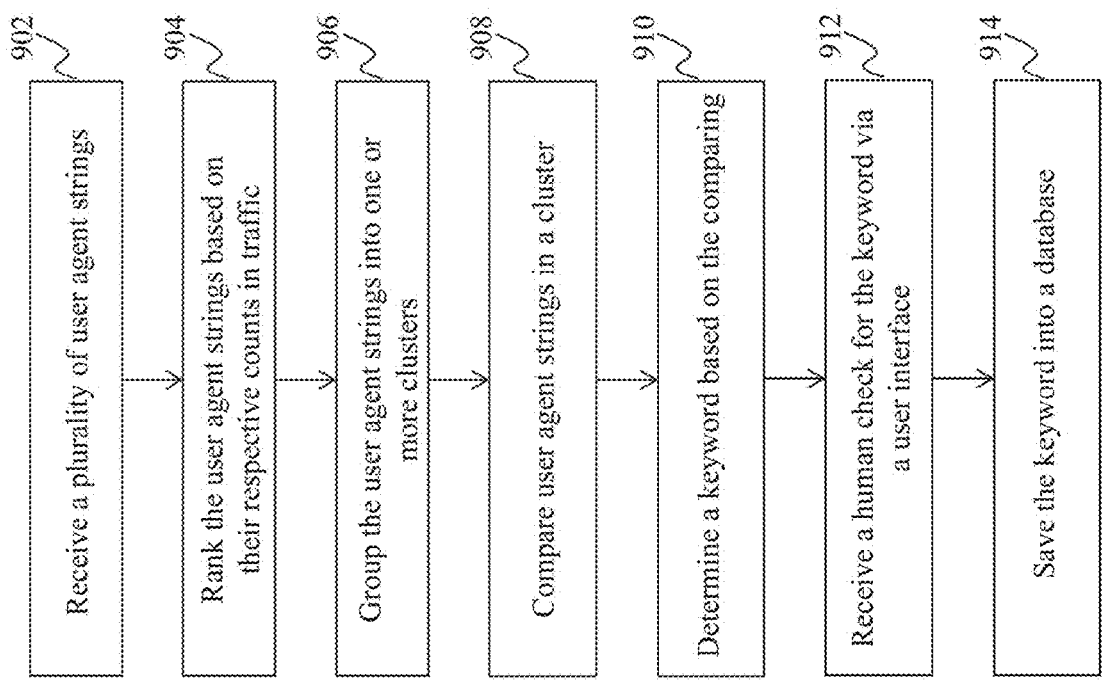
FIG. 9 is a flowchart of an exemplary process performed by an analyzing database building engine, according to an embodiment of the present teaching.

FIG. 9 is a flowchart of an exemplary process performed by the analyzing database building engine 140, according to an embodiment of the present teaching. At 902, a plurality of user agent strings is received. At 904, the user agent strings are ranked based on their respective counts in traffic. At 906, the user agent strings are grouped into one or more clusters. At 908, user agent strings in a cluster are compared. This may happen for each cluster or the top one or more clusters with most user agent strings.

At 910, at least one keyword is determined based on the comparing. At 912, a human check is received for the at least one keyword via a user interface. At 914, the at least one keyword is saved into a database, i.e. the database is updated with the at least one keyword.

Figure 10:
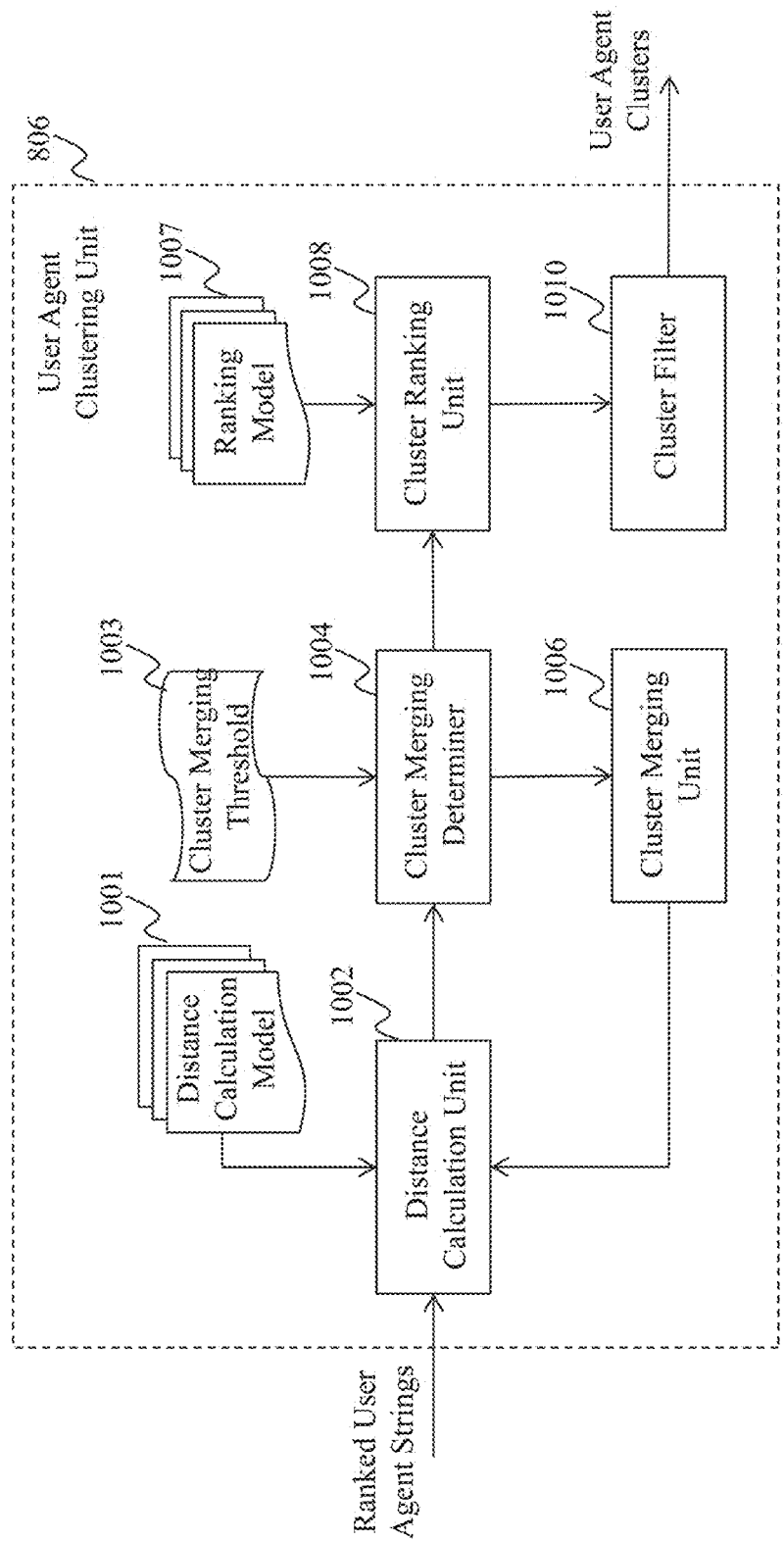
FIG. 10 illustrates an exemplary diagram of a user agent clustering unit, according to an embodiment of the present teaching.

FIG. 10 illustrates an exemplary diagram of a user agent clustering unit, e.g. the user agent clustering unit 806, according to an embodiment of the present teaching. The user agent clustering unit 806 in this example includes a distance calculation unit 1002, a cluster merging determiner 1004, a cluster merging unit 1006, a cluster ranking unit 1008, and a cluster filter 1010. The distance calculation unit 1002 in this example receives user agent strings ranked according to their counts. The distance calculation unit 1002 may select one of the distance calculation models 1001 stored in the user agent clustering unit 806. For example, one distance calculation model may be based on Levenshtein distance. The Levenshtein distance between strings a and b is given by lev(strlen(a), strlen(b)) where $$\text{lev}(i,j) = \max(i,j), \text{ if } \min(i,j) == 0;$$

$$\text{lev}(i,j) = \min(\text{lev}(i-1,j)+1, \text{lev}(i,j-1)+1, \text{lev}(i-1,j-1)+1),$$
$$\text{if } a[i] != b[j];$$

$$\text{lev}(i,j) = \min(\text{lev}(i-1,j)+1, \text{lev}(i,j-1)+1, \text{lev}(i-1,j-1)), \text{ if}$$
$$a[i] == b[j].$$

Accordingly, the distance calculation unit 1002 may calculate a Levenshtein distance between two user agent strings. The distance calculation unit 1002 may also calculate a Levenshtein distance between two clusters of user agent strings, e.g. cluster 1 and cluster 2. The Levenshtein distance between cluster 1 and cluster 2 is a minimum distance among all distances between all pairs of user agent strings (i, j), where i belongs to cluster 1 and j belongs to cluster 2. In one example, the distance calculation unit 1002 may only calculate distances between top ranked user agent strings according to their counts.

The cluster merging determiner 1004 in this example may determine whether to merge two clusters based on a distance between them and a cluster merging threshold 1003 stored in the user agent clustering unit 806. For example, two clusters cannot be merged if a distance between them is larger than the cluster merging threshold 1003. On the other hand, if a distance between two clusters is smaller than the cluster merging threshold 1003, the cluster merging unit 1006 may merge the two clusters into one big cluster.

The distance calculation unit 1002, the cluster merging determiner 1004, and the cluster merging unit 1006 may cooperate to perform a hierarchical agglomerative clustering algorithm. The hierarchical agglomerative clustering algorithm is described as follows:

Input: a set of user agent strings $U=\{u[1], u[2], u[3], \ldots u[n]\}$; a threshold TH Output: a set of clusters $C=\{c[1], c[2], c[3], \ldots, c[m]\}$ Steps:
1. assign each user agent string into a single cluster.
2. calculate distance between all pairs of clusters.
3. let c[i], c[j] be the pair with minimum distance d[ij]. If d[i,j]>TH, go to step 5; otherwise, go to step 4.
4. merge c[i], c[j] into a larger cluster and go to step 1.
5. return the set of clusters C.

In one embodiment, the set of user agent strings U may include only the top ranked user agent strings according to their counts. Given two clusters c[i] and c[j], the distance between them is defined as the minimum Levenshtein distance between all pairs of (u, v), where u belongs to c[i] and v belongs to c[j]. As discussed above, the distance calculation unit 1002 may perform steps 1 and 2. The cluster merging determiner 1004 may perform step 3 to determine whether to merge c[i], c[j] which are two clusters that are closest to each other among all clusters. The cluster merging unit 1006 may perform step 4 to merge c[i] and c[j] if the distance d[ij] between c[i] and c[j] does not exceed the threshold TH. On the other hand, if the distance d[ij] between c[i] and c[j] exceeds the threshold TH, the cluster merging determiner 1004 may perform step 5 to return the set of clusters C, or send the clusters C to the cluster ranking unit 1008.

The threshold TH may be determined based on previous experience and/or modified based on a machine learning model fed with a large volume of training data of user agent strings. In practice, if the threshold TH is too small, the set of clusters C may be too large, which yields a complicated process for keyword extraction, especially when the administrator 150 is needed for final check each newly extracted keyword. On the other hand, if the threshold TH is too large, the number of clusters will be small but the number of user agent strings in each cluster will be large, which may make the comparisons between user agent strings in a cluster too complicated.

The cluster ranking unit 1008 in this example may rank the clusters in C based on a ranking model 1007 stored in the user agent clustering unit 806. According to one ranking model, the cluster ranking unit 1008 may rank the clusters based on number of user agent strings they contain. According to another ranking model, the cluster ranking unit 1008 may rank the clusters in C based on total count of the user agent strings they contain. For example, if a cluster contains two user agent strings, one having count 1000 and the other having count 900, the total count for the cluster will be 1900.

The cluster filter 1010 in this example may filter the ranked clusters to remove lower ranked clusters. As such, only top ranked clusters are sent to the keyword extractor 808 for keyword extraction. In one embodiment, the cluster filter 1010 may allow all ranked clusters be sent to the keyword extractor 808 for keyword extraction.

Figure 11:
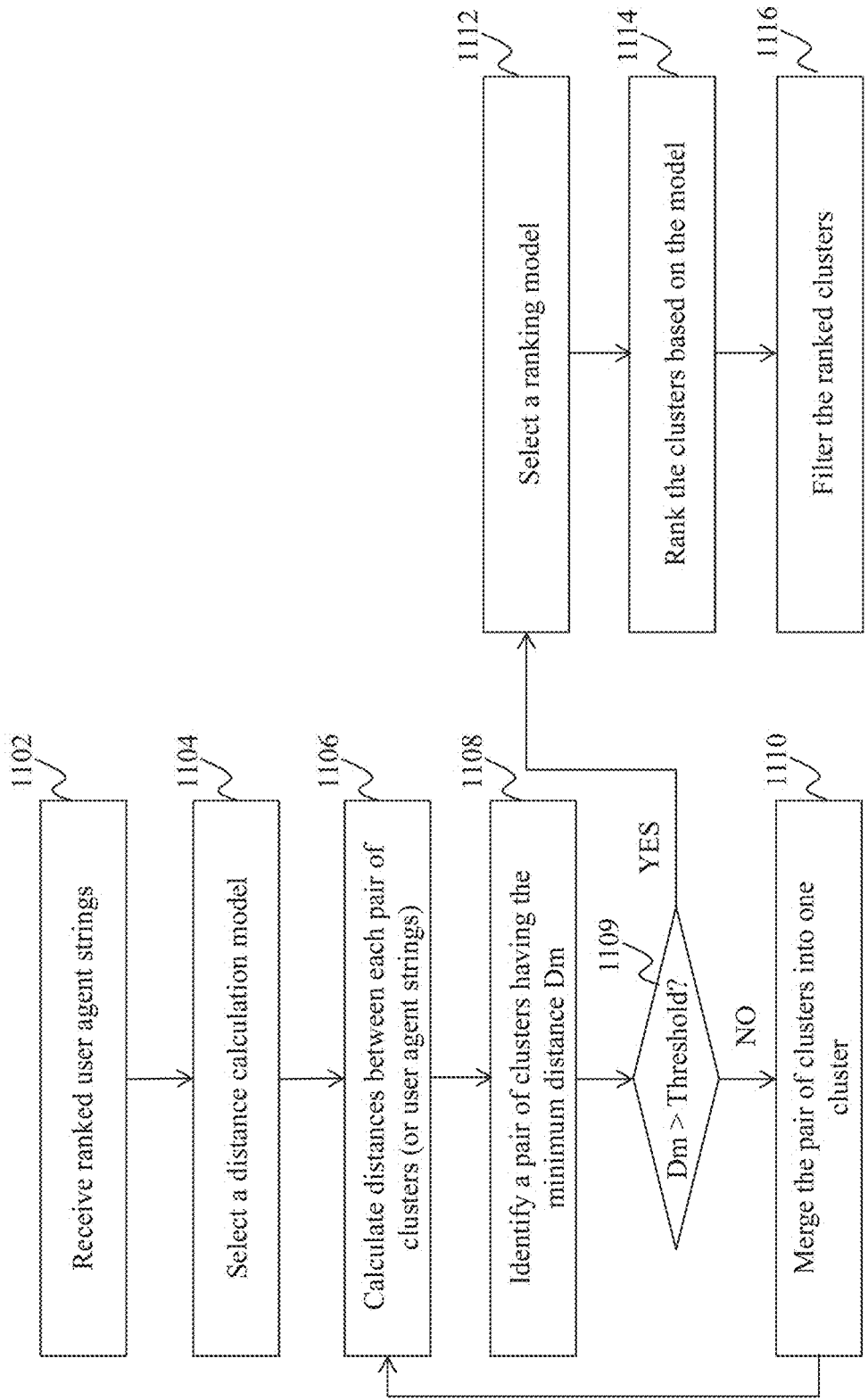
FIG. 11 is a flowchart of an exemplary process performed by a user agent clustering unit, according to an embodiment of the present teaching.

FIG. 11 is a flowchart of an exemplary process performed by the user agent clustering unit 806, according to an embodiment of the present teaching. At 1102, ranked user agent strings are received. At 1104, a distance calculation model is selected. At 1106, distances between each pair of clusters (or user agent strings) are calculated. At 1108, a pair of clusters having the minimum distance Dm is identified.

At 1109, it is determined whether Dm is larger than a predetermined Threshold. If so, the process goes to 1112. Otherwise, the process goes to 1110, where the pair of clusters may be merged into one larger cluster, and the process goes back to 1106. At 1112, a ranking model is selected. At 1114, the clusters are ranked based on the model. At 1116, the ranked clusters are filtered.

Figure 12:
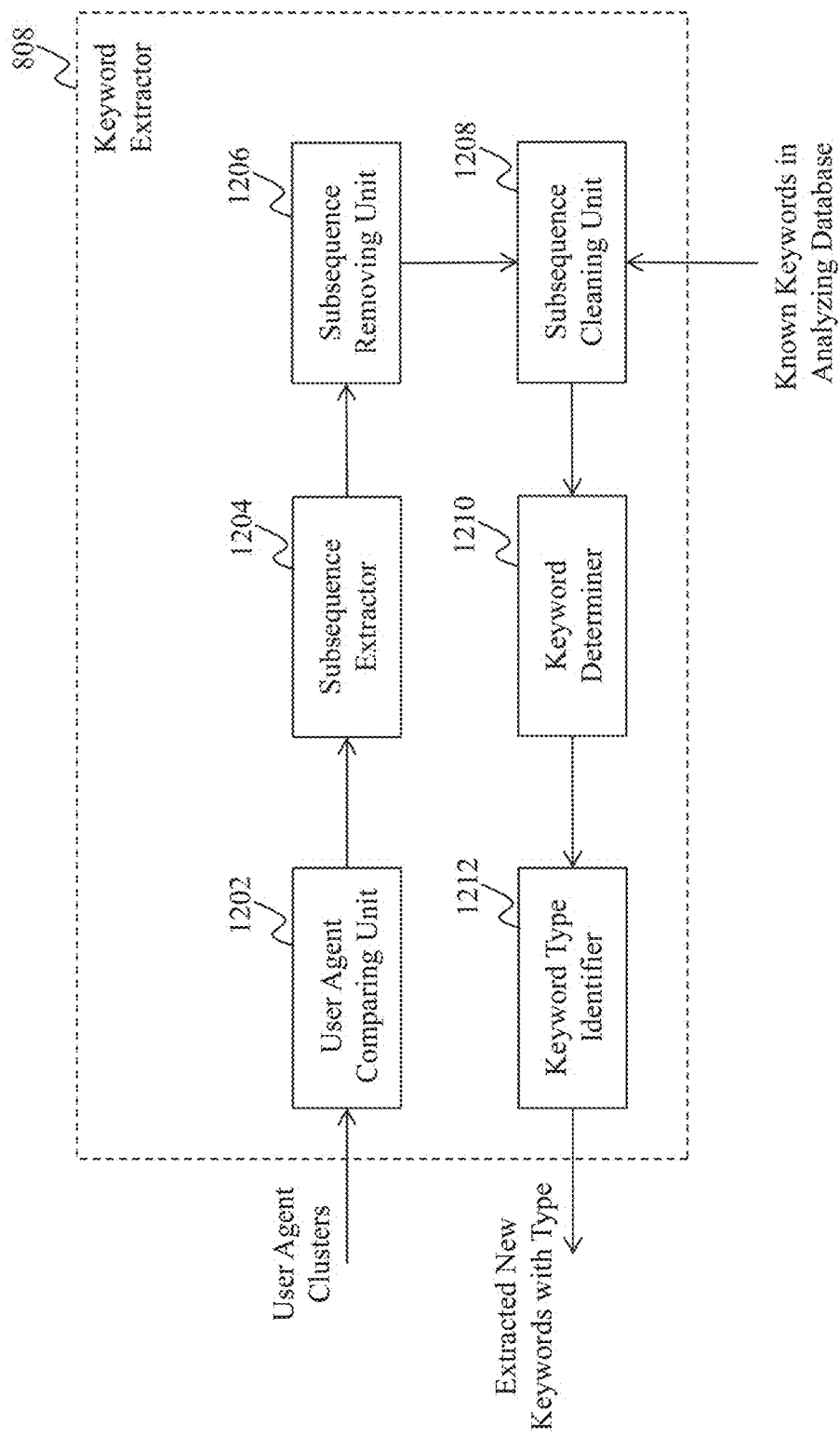
FIG. 12 illustrates an exemplary diagram of a keyword extractor, according to an embodiment of the present teaching.

FIG. 12 illustrates an exemplary diagram of a keyword extractor, e.g. the keyword extractor 808, according to an embodiment of the present teaching. The keyword extractor 808 in this example includes a user agent comparing unit 1202, a subsequence extractor 1204, a subsequence removing unit 1206, a subsequence cleaning unit 1208, a keyword determiner 1210, and a keyword type identifier 1212. The user agent comparing unit 1202 in this example can receive user agent clusters from the user agent clustering unit 806. The clusters may be ranked in an order.

For each cluster, the subsequence extractor 1204 may compare the user agent strings within the cluster. Based on the comparisons, the subsequence extractor 1204 may extract a longest common subsequence (LCS) among the user agent strings. In one embodiment, the subsequence extractor 1204 may perform the comparing and extracting on clusters one by one, according to their respective ranked order. The subsequence removing unit 1206 in this example removes the LCS from each user agent string in the cluster to obtain a remaining subsequence. The subsequence cleaning unit 1208 may clean the LCS and/or the remaining subsequence by removing predefined noises. In one embodiment, the subsequence cleaning unit 1208 may retrieve known keywords from the analyzing database 130, and remove the known keywords from the LCS and/or the remaining subsequence.

The keyword determiner 1210 in this example can determine one or more new keywords from the cleaned LCS and/or the cleaned remaining subsequence. The keyword type identifier 1212 in this example identifies the keyword's type, which may be a new device model, a new OS name, a new browser name, etc. This may depends on comparisons with known keyword types. The keyword type identifier 1212 may then send the new keywords with their associated types.

For example, given a cluster with two user agent strings:
UCWEB/2.0(Linux; U; en-us; GT-57262 Build/JZO54K) U2/1.0.0 UCBrowser/9.4.1.362 Mobile;
UCWEB/2.0(Linux; U; en-us; AKL_M501 Build/ IMM76D) U2/1.0.0 UCBrowser/9.4.1.362 Mobile
The LCS will be "UCWEB/2.0(Linux; U; en-us; Build/) U2/1.0.0 UCBrowser/9.4.1.362 Mobile".
Let the predefined noises set be {"U;", "en-us;", "Build/", "U2/", "Mobile", . . . }. Then, the clean LCS after removing all the noises and numbers should be "UCWEB Linux UCBrowser", which are keywords indicating a new OS/browser name. Furthermore, if the system removes LCS from the two user agent strings, to obtain remaining subsequences "GT-S7262 JZO54K" and "AKL_M501 IMM76D", which are keywords indicating new device models. These newly identified keywords will be sent and stored into the analyzing database 130.

Figure 13:
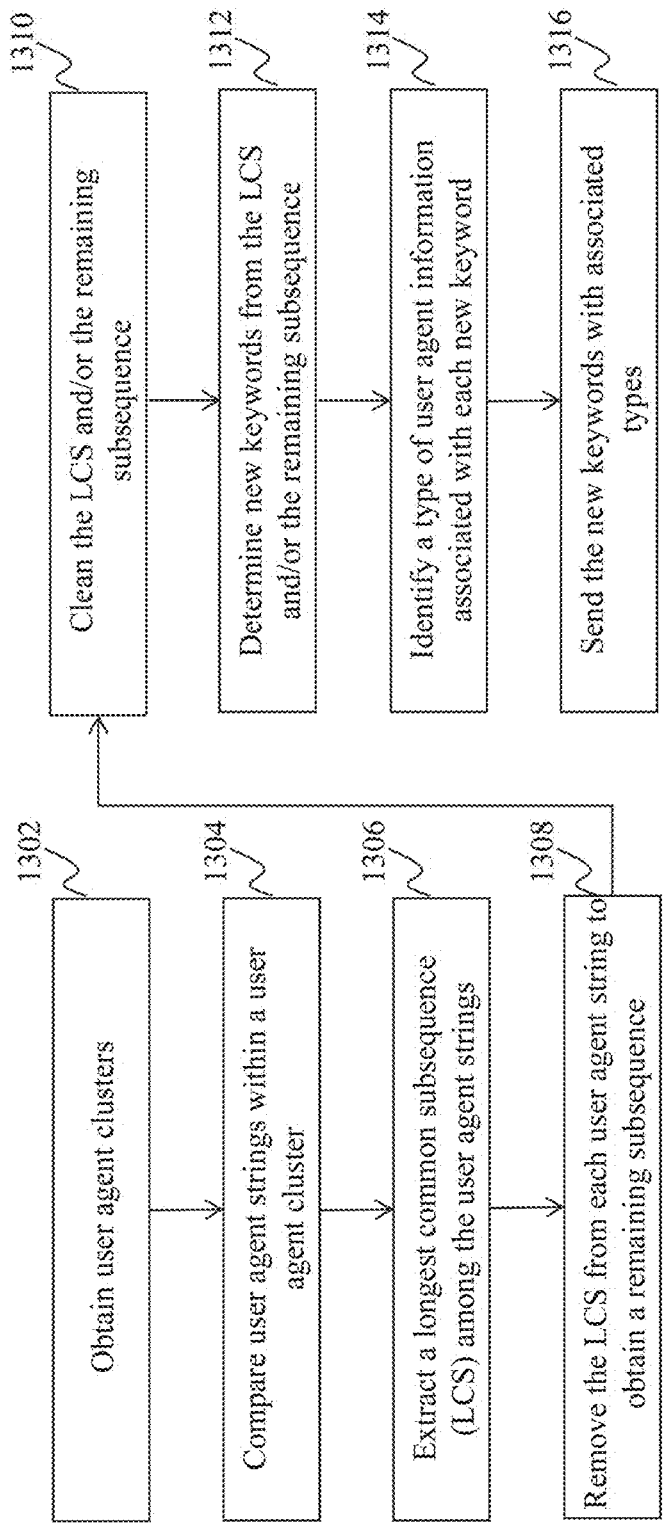
FIG. 13 is a flowchart of an exemplary process performed by a keyword extractor, according to an embodiment of the present teaching.

FIG. 13 is a flowchart of an exemplary process performed by the keyword extractor 808, according to an embodiment of the present teaching. At 1302, user agent clusters are obtained. At 1304, user agent strings within a user agent cluster are compared. At 1306, a longest common subsequence (LCS) among the user agent string is extracted. At 1308, the LCS is removed from each user agent string to obtain a remaining subsequence.

At 1310, the LCS and/or the remaining subsequence are cleaned. At 1312, new keywords are determined from the LCS and/or the remaining subsequence. At 1314, a type of user agent information is identified associated with each new keyword. At 1316, the new keywords are sent with their associated types.

Figure 14:
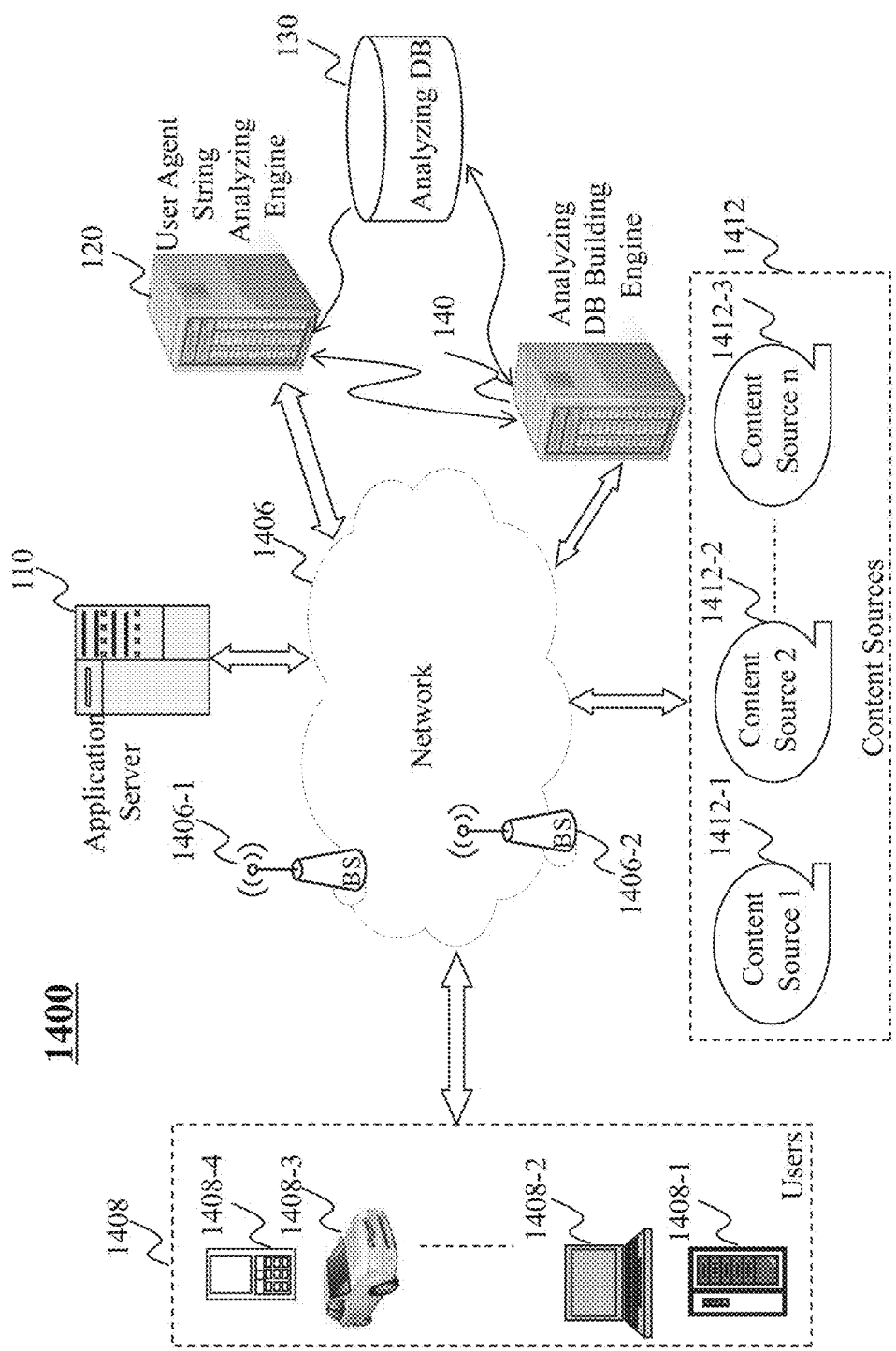
FIG. 14 is a high level depiction of an exemplary networked environment for analyzing user agent strings, according to an embodiment of the present teaching.

FIG. 14 is a high level depiction of an exemplary networked environment for analyzing user agent strings, according to an embodiment of the present teaching. In FIG. 14, the exemplary system 1400 includes the application server 110, the user agent string analyzing engine 120, the analyzing database 130, the analyzing database building engine 140, one or more users 1408, a network 1406, and content sources 1412. The network 1406 may be a single network or a combination of different networks. For example, the network 1406 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 1406 may be an online advertising network or ad network that is a company connecting advertisers to web sites that want to host advertisements. A key function of an ad network is aggregation of ad space supply from publishers and matching it with advertiser demand. The network 1406 may also include various network access points, e.g., wired or wireless access points such as base stations or Internet exchange points 1406-1 . . . 1406-2, through which a data source may connect to the network 1406 in order to transmit information via the network 1406.

Users 1408 may be of different types such as users connected to the network 1406 via desktop computers 1408-1, laptop computers 1408-2, a built-in device in a motor vehicle 1408-3, or a mobile device 1408-4. A user 1408 may send a user agent string to the application server 110 and/or the user agent string analyzing engine 120 via the network 1406. In this embodiment, the user agent string database 104 may be located in the application server 110 and can be accessed by the user agent string analyzing engine 120 and/or the analyzing database building engine 140. The user agent string analyzing engine 120 and the analyzing database building engine 140 can work with the analyzing database 130 as discussed above.

The content sources 1412 include multiple content sources 1412-1, 1412-2 . . . 1412-3, such as vertical content sources. A content source 1412 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The application server 110 may access information from any of the content sources 1412-1, 1412-2 . . . 1412-3.

Figure 15:
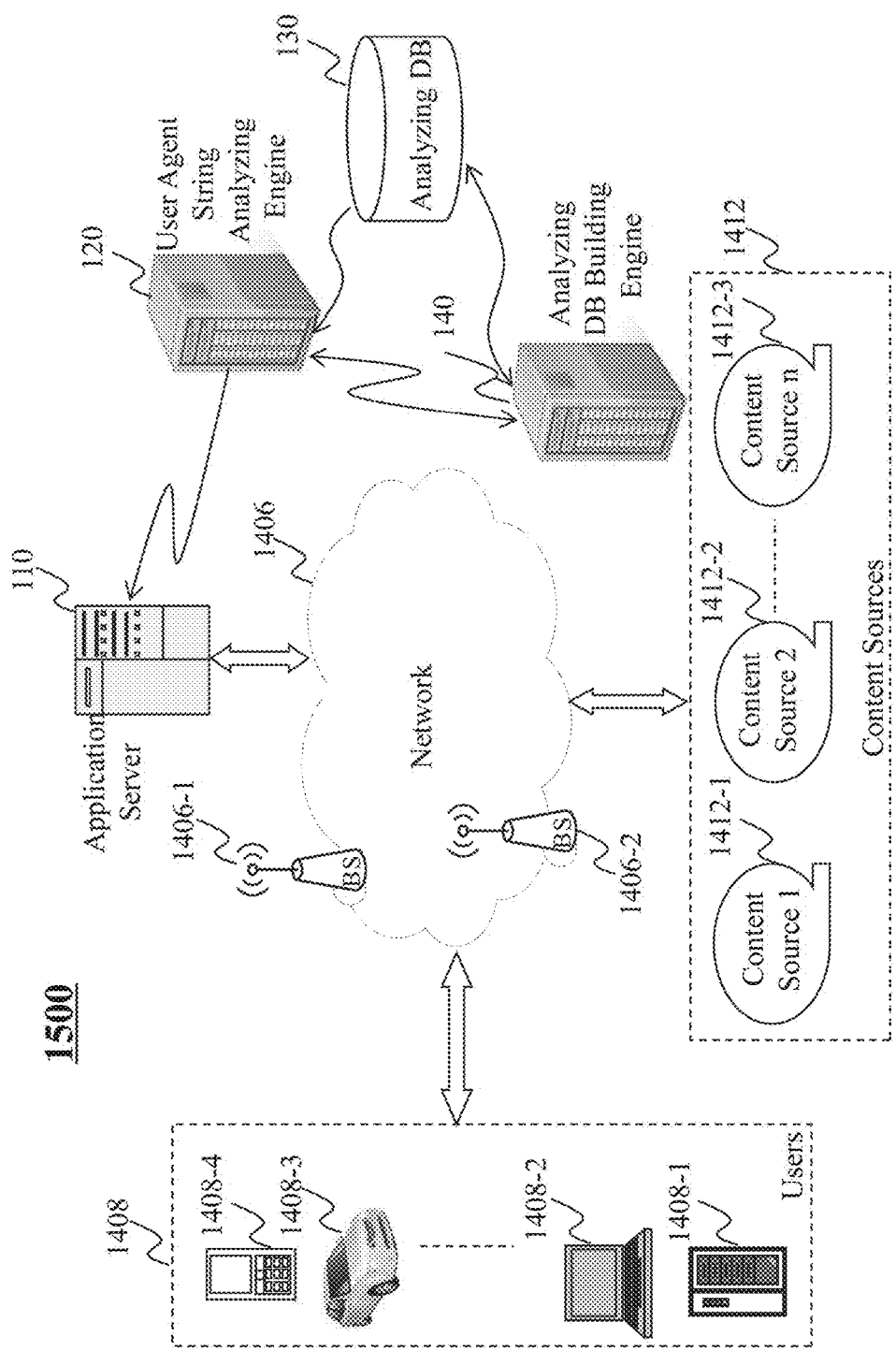
FIG. 15 is a high level depiction of another exemplary networked environment for analyzing user agent strings, according to an embodiment of the present teaching.

FIG. 15 is a high level depiction of another exemplary networked environment for analyzing user agent strings, according to an embodiment of the present teaching. The exemplary system 1500 in this embodiment is similar to the exemplary system 1400 in FIG. 14, except that the user agent string analyzing engine 120 and the analyzing database building engine 140 in this embodiment serve as backend systems of the application server 110.

Figure 16:
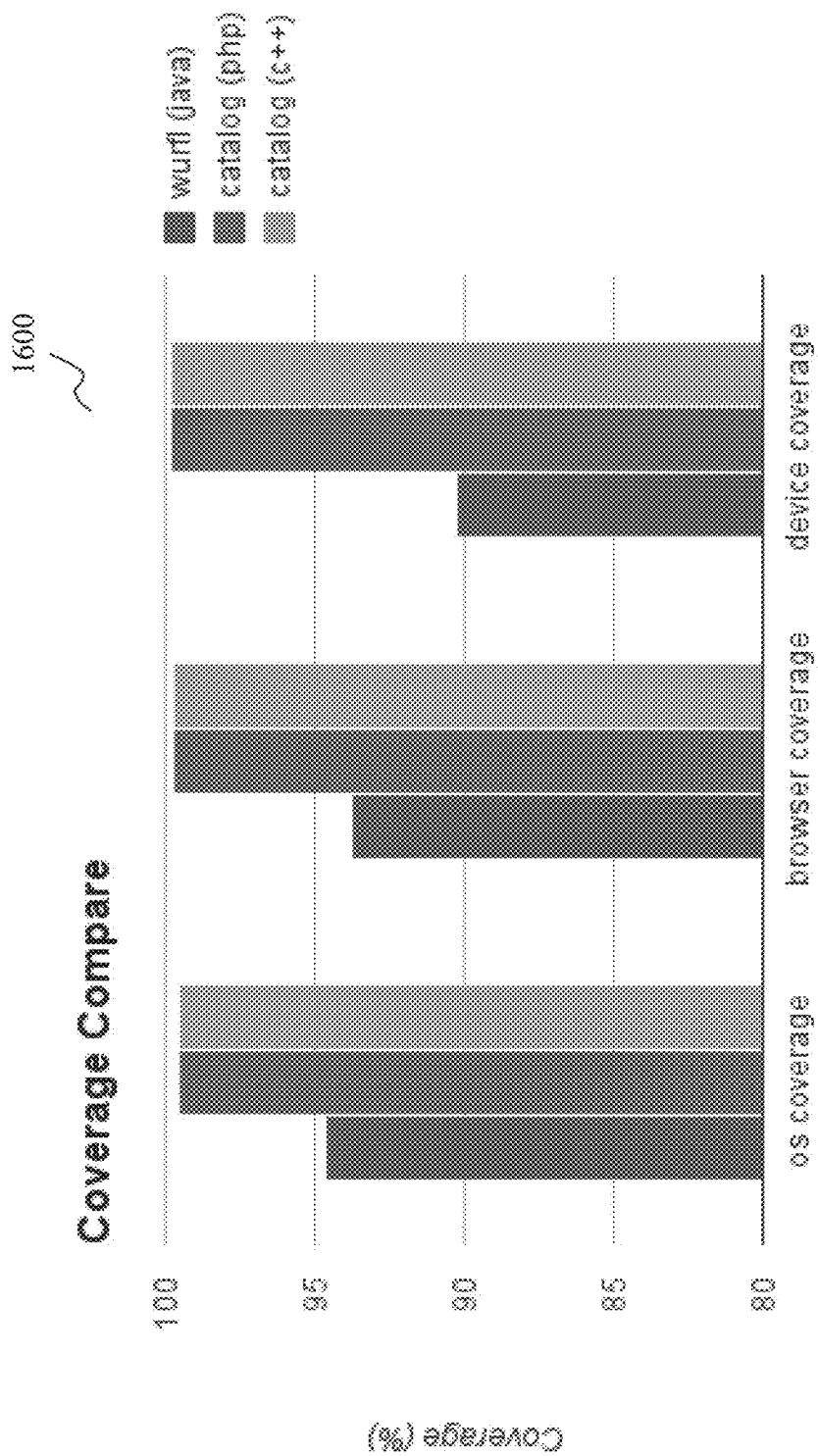
FIG. 16 illustrates coverage rates for detecting different user agent identity information, according to an embodiment of the present teaching.

FIG. 16 illustrates coverage rates for detecting different user agent identity information, according to an embodiment of the present teaching. As shown in FIG. 16, the method in present disclosure (referred as catalog) can provide a coverage rate more than 99%, for OS, browser, and device. This means that a user agent string may be identified with a probability of more than 99% using the method disclosed above. In contrast, an existing product WURFL (Wireless Universal Resource FiLe) may only achieve a coverage rate for OS and browser at below 95%. The device coverage rate for WURFL is around 90%. In addition, the method in present disclosure can achieve 100% accuracy rate with only 0.89 ms time cost of detection. Regarding to the maintenance effort, the method in present disclosure can reduce it to 10 percent of the existing method.

Figure 17:
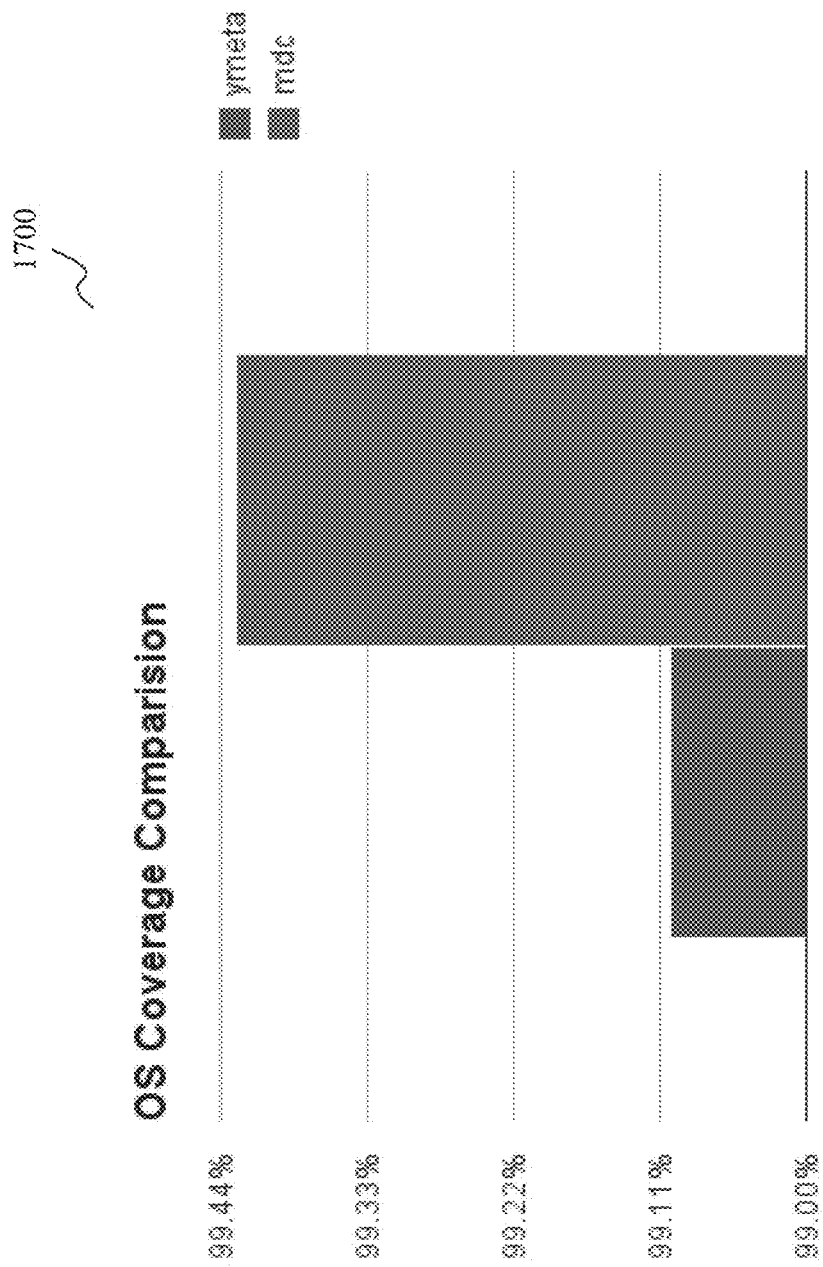
FIG. 17 illustrates OS coverage rates of different products, according to an embodiment of the present teaching.

FIG. 17 illustrates OS coverage rates of different products, according to an embodiment of the present teaching. While the method in present disclosure (referred as mdc) can achieve an OS coverage rate around 99.4%, an existing product (referred as Ymeta) can achieve an OS coverage rate around 99.1%.

Figure 18:
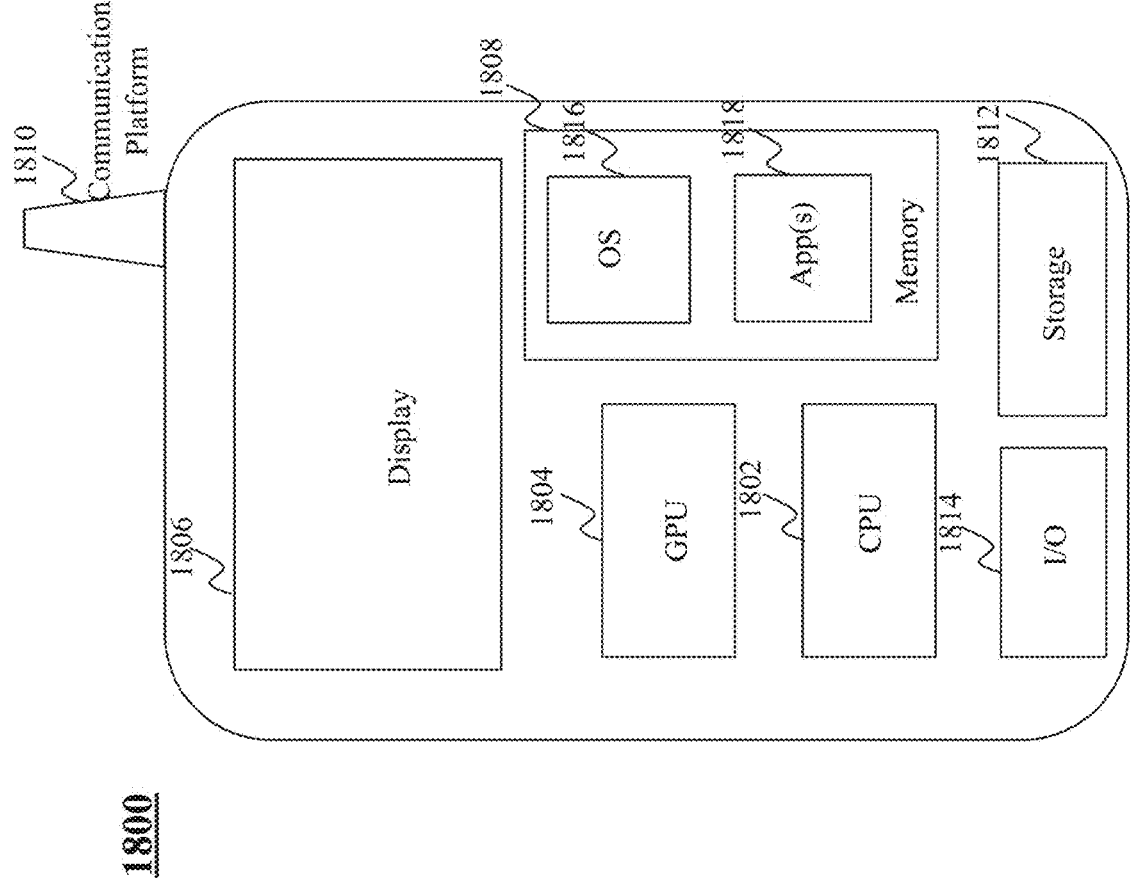
FIG. 18 depicts a general mobile device architecture on which the present teaching can be implemented.

FIG. 18 depicts a general mobile device architecture on which the present teaching can be implemented. In this example, the user device 1408 is a mobile device 1800, including but is not limited to, a smart phone, a tablet, a music player, a handled gaming console, a GPS receiver. The mobile device 1800 in this example includes one or more central processing units (CPUs) 1802, one or more graphic processing units (GPUs) 1804, a display 1806, a memory 1808, a communication platform 1810, such as a wireless communication module, storage 1812, and one or more input/output (I/O) devices 1814. Any other suitable component, such as but not limited to a system bus or a controller (not shown), may also be included in the mobile device 1800. As shown in FIG. 18, a mobile operating system 1816, e.g., iOS, Android, Windows Phone, etc., and one or more applications 1818 may be loaded into the memory 1808 from the storage 1812 in order to be executed by the CPU 1802. The applications 1818 may include a web browser or any other suitable mobile search apps. Execution of the applications 1818 may cause the mobile device 1800 to perform some processing as described before. For example, the user agent string may be sent by the GPU 1804 in conjunction with the applications 1818.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 19:
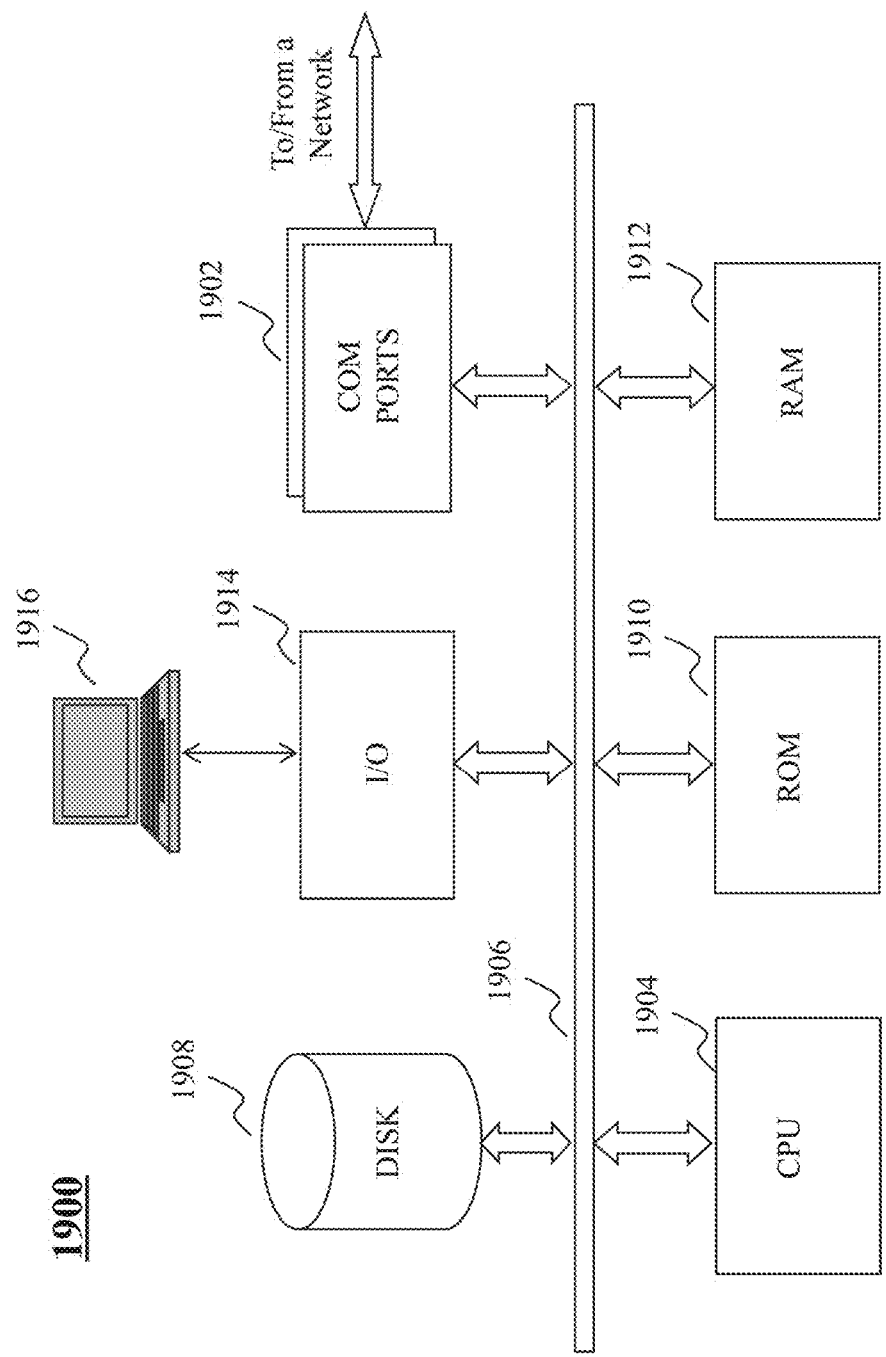
FIG. 19 depicts a general computer architecture on which the present teaching can be implemented.

FIG. 19 depicts a general computer architecture on which the present teaching can be implemented and has a functional block diagram illustration of a computer hardware platform that includes user interface elements. The computer may be a general-purpose computer or a special purpose computer. This computer 1900 can be used to implement any components of the user agent string analysis architecture as described herein. Different components of the system, e.g., as depicted in FIGS. 14 and 15, can all be implemented on one or more computers such as computer 1900, via its hardware, software program, firmware, or a combination thereof. Although only one such computer is shown, for convenience, the computer functions relating to user agent string analysis may be implemented in a distributed fashion on a number of similar platforms, to distribute the processing load.

The computer 1900, for example, includes COM ports 1902 connected to and from a network connected thereto to facilitate data communications. The computer 1900 also includes a CPU 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU 1904. The computer 1900 also includes an I/O component 1914, supporting input/output flows between the computer and other components therein such as user interface elements 1916. The computer 1900 may also receive programming and data via network communications.

Hence, aspects of the method of user agent string analysis, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device, each of which includes at least one processor, storage, and a communication platform connected to a network for recognizing user agent strings, the method comprising:
   receiving a plurality of user agent strings in data traffic;
   generating a rank of the plurality of user agent strings based on a number of times each of the plurality of user agent strings appeared in the data traffic, wherein the rank indicates popularity of each of the plurality of user agent strings;
   selecting, based on the rank, multiple of the plurality of user agent strings;
   comparing the multiple of the plurality of user agent strings; and
   determining one or more keywords representing a type of user agent information based on a result from the comparing.

2. The method of claim 1, further comprising:
   grouping the plurality of user agent strings into one or more clusters, wherein the multiple of the plurality of user agent strings that are compared are from a same cluster.

3. The method of claim 2, wherein the one or more clusters comprise a plurality of clusters, the method further comprises:
   determining a distance between one or more pairs of clusters from the plurality of clusters;
   determining that the distance between at least one of the one or more pairs of clusters is less than or equal to a threshold; and
   generating a merged cluster for each of the at least one of the one or more pairs of clusters.

4. The method of claim 3, wherein the threshold is at least one of predetermined or modified based on a machine learning model.

5. The method of claim 2, further comprising:
   generating a ranked list of the one or more clusters; and
   determining a highest ranked cluster based on the ranked list, wherein the multiple of the plurality of user agent strings are selected from the highest ranked cluster.

6. The method of claim 1, wherein the plurality of user agent strings comprise at least one of:
   user agent strings obtained from a user agent string database that have had a detection failure; or
   user agent strings unrecognized by a user agent string analyzing engine, wherein the one or more keywords are stored for analyzing subsequently received user agent strings.

7. The method of claim 1, wherein determining the one or more keywords comprises:
   determining the multiple user agent strings from a first cluster of user agent strings; and
   determining that the multiple user agent strings comprise a keyword, the keyword being determined based on a longest common subsequence amongst the two or more user agent strings, and a remaining subsequence obtained in response to removing the longest common subsequence.

8. A system including at least one processor, storage, and a communication platform connected to a network for recognizing user agent strings, the system comprising:

a user agent receiver configured to receive a plurality of user agent strings in data traffic;

a count based ranking unit configured to generate a rank of the plurality of user agent strings based on a number of times each of the plurality of user agent strings appeared in the data traffic, wherein the rank indicates popularity of each of the plurality of user agent strings; and a keyword extractor configured to:
- select, based on the rank, multiple of the plurality of user agent strings;
- compare the multiple of the plurality of user agent strings; and
- determine one or more keywords representing a type of user agent information based on a result from the comparison.

9. The system of claim 8, further comprising:
a user agent clustering unit configured to group the plurality of user agent strings into one or more clusters, wherein the multiple of the plurality of user agent strings that are compared are from a same cluster.

10. The system of claim 9, wherein the one or more clusters comprise a plurality of clusters, the user agent clustering unit comprises:
- a distance calculation unit configured to determine a distance between one or more pairs of clusters from the plurality of clusters;
- a cluster merging determiner configured to determine that the distance between at least one of the one or more pairs of clusters is less than or equal to a threshold; and
- a cluster merging unit configured to generate a merged cluster for each of the at least one of the one or more pairs of clusters.

11. The system of claim 10, wherein the threshold is at least one of predetermined or modified based on a machine learning model.

12. The system of claim 9, further comprising:
a cluster ranking unit configured to:
- generate a ranked list of the one or more clusters, and
- determine a highest ranked cluster based on the ranked list, wherein the multiple of the plurality of user agent strings are selected from the highest ranked cluster.

13. The system of claim 8, wherein the plurality of user agent strings comprise at least one of:

user agent strings obtained from a user agent string database that have had a detection failure; or user agent strings unrecognized by a user agent string analyzing engine, wherein the one or more keywords are stored for analyzing subsequently received user agent strings.

14. A non-transitory machine-readable medium comprising information for determining a keyword from user agent strings, wherein the information, when read by a machine, causes the machine to perform operations comprising:
- receiving a plurality of user agent strings in data traffic;
- generating a rank of the plurality of user agent strings based on a number of times each of the plurality of user agent strings appeared in the data traffic, wherein the rank indicates popularity of each of the plurality of user agent strings;
- selecting, based on the rank, multiple of the plurality of user agent strings;
- comparing the multiple of the plurality of user agent strings; and
- determining one or more keywords representing a type of user agent information based on a result from the comparing.

15. The non-transitory machine-readable medium of claim 14, wherein the operations further comprise:
grouping the plurality of user agent strings into one or more clusters, wherein the multiple of the plurality of user agent strings that are compared are from a same cluster.

16. The non-transitory machine-readable medium of claim 15, wherein the one or more clusters comprise a plurality of clusters, the operations further comprise:
- determining a distance between one or more pairs of clusters from the plurality of clusters;
- determining that the distance between at least one of the one or more pairs of clusters is less than or equal to a threshold; and
- generating a merged cluster for each of the at least one of the one or more pairs of clusters.

17. The non-transitory machine-readable medium of claim 15, wherein the operations further comprise:
- generating a ranked list of the one or more clusters; and
- determining a highest ranked cluster based on the ranked list, wherein the multiple of the plurality of user agent strings are selected from the highest ranked cluster.

* * * * *